US012558712B1

(12) United States Patent

Morgan

(10) Patent No.: US 12,558,712 B1
(45) Date of Patent: Feb. 24, 2026

(54) SYSTEMS AND METHODS FOR AUTOMATED PRODUCE GRADING AND SORTING USING MACHINE VISION AND ROBOTICS

(71) Applicant: Ascension Automation Solutions Ltd., Cambridge (CA)

(72) Inventor: Andrew Morgan, Guelph (CA)

(73) Assignee: Ascension Automation Solutions Ltd., Cambridge (CA)

( * ) Notice: Subject to any disclaimer, the term of this patent is extended or adjusted under 35 U.S.C. 154(b) by 0 days.

(21) Appl. No.: 19/267,432

(22) Filed: Jul. 11, 2025

(51) Int. Cl.
| B07C 5/342 | (2006.01) |
| B07C 5/36 | (2006.01) |
| B25J 9/16 | (2006.01) |
| G06T 7/00 | (2017.01) |
| G06V 10/44 | (2022.01) |
| (Continued) | |

(52) U.S. Cl.
CPC ............ B07C 5/3422 (2013.01); B07C 5/362 (2013.01); B25J 9/1682 (2013.01); B25J 9/1697 (2013.01); G06T 7/001 (2013.01); G06V 10/457 (2022.01); G06V 10/764 (2022.01); G06V 10/766 (2022.01); G06V 10/7715 (2022.01); G06V 10/98 (2022.01); G06V 20/68 (2022.01);
(Continued)

(58) Field of Classification Search
CPC ........ B07C 5/34; B07C 5/3422; G06V 10/98; G06V 10/457; G06V 10/7715; G06V 20/68
USPC ....................................................... 209/577
See application file for complete search history.

(56) References Cited

U.S. PATENT DOCUMENTS 5,526,119 A * 6/1996 Blit ........................ B07C 5/3422
356/402
6,271,520 B1 * 8/2001 Tao .................... G01N 21/3563
250/910
(Continued)

FOREIGN PATENT DOCUMENTS

CN 111832481 A * 10/2020 .......... G06F 18/2411
CN 113751355 A 12/2021
(Continued)

OTHER PUBLICATIONS

Anjali Sharma et al The Good, The Bad and The Ugly: An Open Image Dataset for Automated Sorting of Good, Bad, and Imperfect Produce Using AI and Robotics Sustainability 2024, 16(15).

*Primary Examiner* — Terrell H Matthews
(74) *Attorney, Agent, or Firm* — Caldwell Intellectual Property Law

(57) ABSTRACT

A system including: a robotic frame including at least an actuated arm, a machine-vision system including at least a camera, the machine-vision system communicatively connected to a computing device, the computing device including at least a processor and a memory communicatively connected to the at least a processor, the memory storing instructions configuring the at least a processor to: receive image data from the at least a camera, the image data including at least two captured viewpoints of a produce item, extract at least an object-level visual feature from the image data using a machine vision model, assign a defect classification label to the produce item as a function of the at least an object-level visual feature, and control the at least an actuated arm to perform a handling operation on the produce item as a function of the defect classification label.

18 Claims, 9 Drawing Sheets

(51) Int. Cl.

| | | |
|---|---|---|
| *G06V 10/764* | (2022.01) | |
| *G06V 10/766* | (2022.01) | |
| *G06V 10/77* | (2022.01) | |
| *G06V 10/98* | (2022.01) | |
| *G06V 20/68* | (2022.01) | |

(52) U.S. Cl.

CPC ................. *B07C 2501/0063* (2013.01); *B07C 2501/0081* (2013.01); *G06T 2207/30128* (2013.01)

(56) References Cited

U.S. PATENT DOCUMENTS

| | | | | | |
|---|---|---|---|---|---|
| 8,443,982 | B2 * | 5/2013 | Stueven | .................... | B07B 1/00 209/322 |
| 10,650,232 | B2 * | 5/2020 | He | ......................... | G06V 10/40 |
| 11,623,250 | B2 * | 4/2023 | Nygaard | .............. | B07C 5/3416 209/576 |
| 12,194,507 | B2 * | 1/2025 | Hegde | ....................... | B07C 5/36 |
| 12,340,287 | B2 * | 6/2025 | Horowitz | .............. | G06N 20/00 |
| 2015/0054959 | A1 * | 2/2015 | He | .......................... | G06V 10/40 348/150 |
| 2023/0196188 | A1 * | 6/2023 | Horowitz | .............. | G06N 20/00 209/577 |
| 2023/0203747 | A1 * | 6/2023 | Kothari | ................. | G06T 7/0004 209/577 |
| 2023/0321694 | A1 * | 10/2023 | Hegde | ................... | G06V 20/60 209/577 |

FOREIGN PATENT DOCUMENTS

| | | | | | | |
|---|---|---|---|---|---|---|
| CN | 110659333 | B | * | 4/2022 | ........... | G06F 16/739 |
| EP | 0058028 | A2 | * | 8/1982 | ............. | G01N 21/88 |
| IN | 202321042855 | A | | 9/2023 | | |
| IN | 202541023759 | A | | 3/2025 | | |
| KR | 20070007712 | A | * | 1/2007 | .............. | B07C 5/18 |
| WO | WO-2023156988 | A1 | * | 8/2023 | ............. | G06V 20/68 |

* cited by examiner

206

208

210

204

200a

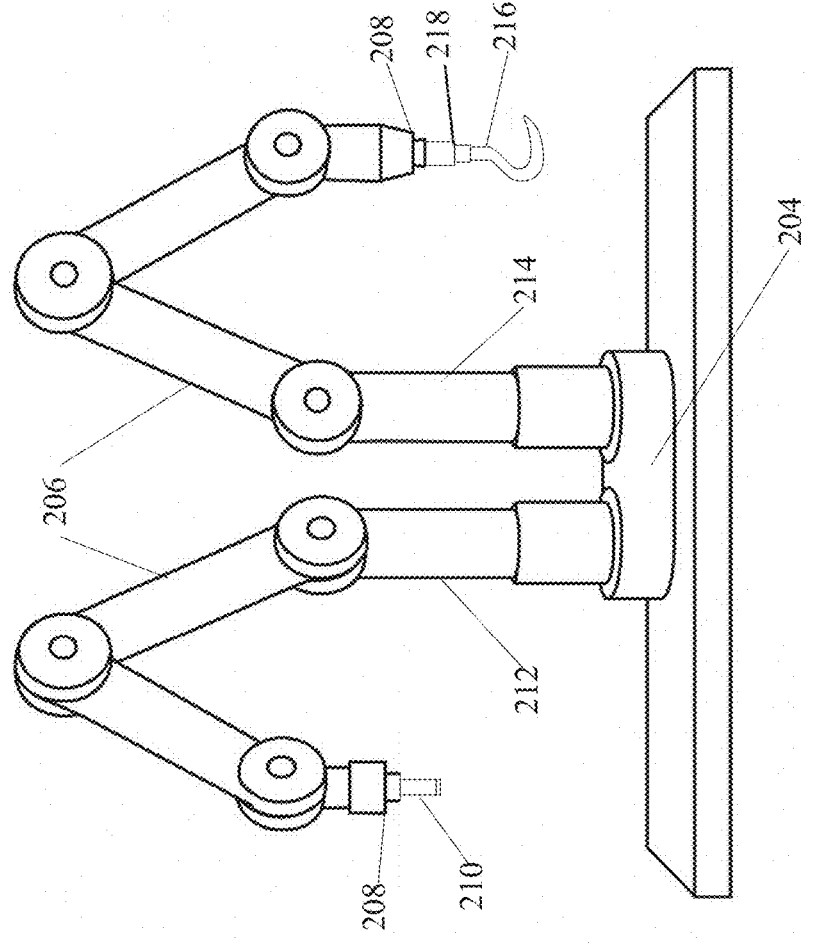
FIG. 2B

300c

FIF. 3C

300f

300b

300e

300a

300d

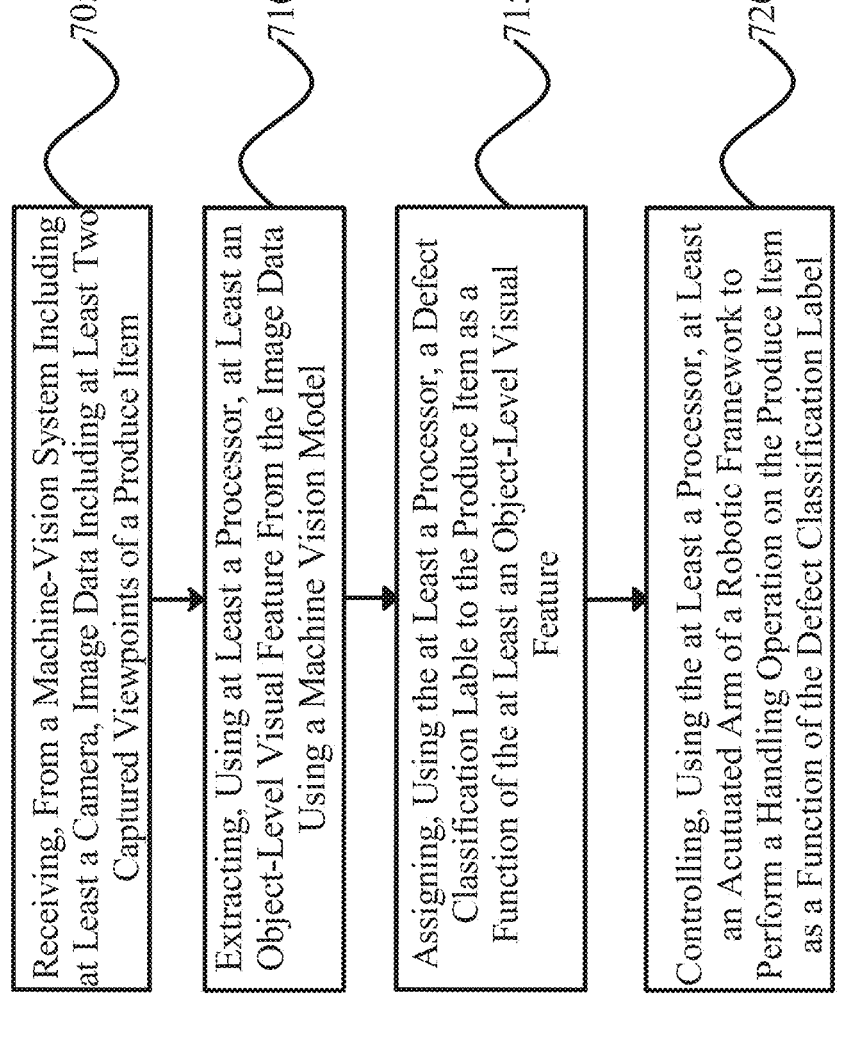

705 Receiving, From a Machine-Vision System Including at Least a Camera, Image Data Including at Least Two Captured Viewpoints of a Produce Item 710 Extracting, Using at Least a Processor, at Least an Object-Level Visual Feature From the Image Data Using a Machine Vision Model 715 Assigning, Using the at Least a Processor, a Defect Classification Lable to the Produce Item as a Function of the at Least an Object-Level Visual Feature 720 Controlling, Using the at Least a Processor, at Least an Acutuated Arm of a Robotic Framework to Perform a Handling Operation on the Produce Item as a Function of the Defect Classification Label

SYSTEMS AND METHODS FOR AUTOMATED PRODUCE GRADING AND SORTING USING MACHINE VISION AND ROBOTICS

FIELD OF THE INVENTION

The present invention generally relates to the field of agriculture automation. In particular, the present invention is directed to systems and methods for automated produce grading and sorting using machine vision and robotics.

BACKGROUND

Grading and sorting agricultural produce is technically challenging due to natural variation in shape, size, surface features, and internal condition. Manual inspection methods are limited in precision and repeatability, particularly when distinguishing subtle differences in hydration, ripeness, or structural integrity. Variability in lighting, produce orientation, and occlusions further complicate consistent evaluation. Accurate localization of features such as stems or defects requires robust visual processing across multiple viewpoints and dimensions. These technical constraints hinder the development of fully automated, high-throughput systems for reliable produce handling.

SUMMARY OF THE DISCLOSURE

In some aspects, the techniques described herein relate to a system for automated produce grading and sorting using machine vision and robotics, the system including: a robotic frame including at least an actuated arm, a machine-vision system including at least a camera, the machine-vision system communicatively connected to a computing device, the computing device including at least a processor and a memory communicatively connected to the at least a processor, the memory storing instructions configuring the at least a processor to: receive image data from the at least a camera, the image data including at least two captured viewpoints of a produce item, extract at least an object-level visual feature from the image data using a machine vision model, assign a defect classification label to the produce item as a function of the at least an object-level visual feature, and control the at least an actuated arm to perform a handling operation on the produce item as a function of the defect classification label.

In some aspects, the techniques described herein relate to a method for automated produce grading and sorting using machine vision and robotics, the method including: receiving, from a machine-vision system including at least a camera, image data including at least two captured viewpoints of a produce item, extracting, using at least a processor, at least an object-level visual feature from the image data using a machine vision model, assigning, using the at least a processor, a defect classification label to the produce item as a function of the at least an object-level visual feature, and controlling, using the at least a processor, at least an actuated arm of a robotic framework to perform a handling operation on the produce item as a function of the defect classification label.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2B illustrates an exemplary system including a dual-arm configuration with a first arm supporting a removal tool and a second arm supporting a handling mechanism;

FIGS. 3A-3F is a depiction of various end effectors used for produce manipulation;

FIG. 7 is a flow diagram of an exemplary method for automated produce grading and sorting using machine vision and robotics.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for automated grading, classification, and sorting of produce items using machine vision and robotic handling. In an embodiment, a machine-vision system captures image data of a produce item from multiple viewpoints, extracts object-level visual features using a trained model and classifies the produce item by defect type to control an actuated arm for targeted handling or removal.

Aspects of the present disclosure can be used to detect subtle quality defects in agricultural products, such as dehydration, surface cracking, or stem detachment, using threshold-based analysis of visual features. Aspects of the present disclosure can also be used to perform stem-aware trimming or repositioning operations through the generation of three-dimensional spatial representations and pose estimation. This is so, at least in part, because the system leverages real-time computer vision and conditional logic to trigger adaptive responses, such as secondary image capture or tool selection, based on classification ambiguity or defect type.

Aspects of the present disclosure allow for high-throughput, precision grading and sorting of produce items in environments where manual inspection is inefficient or inconsistent. Exemplary embodiments illustrating aspects of the present disclosure are described below in the context of several specific examples.

Figure 1:
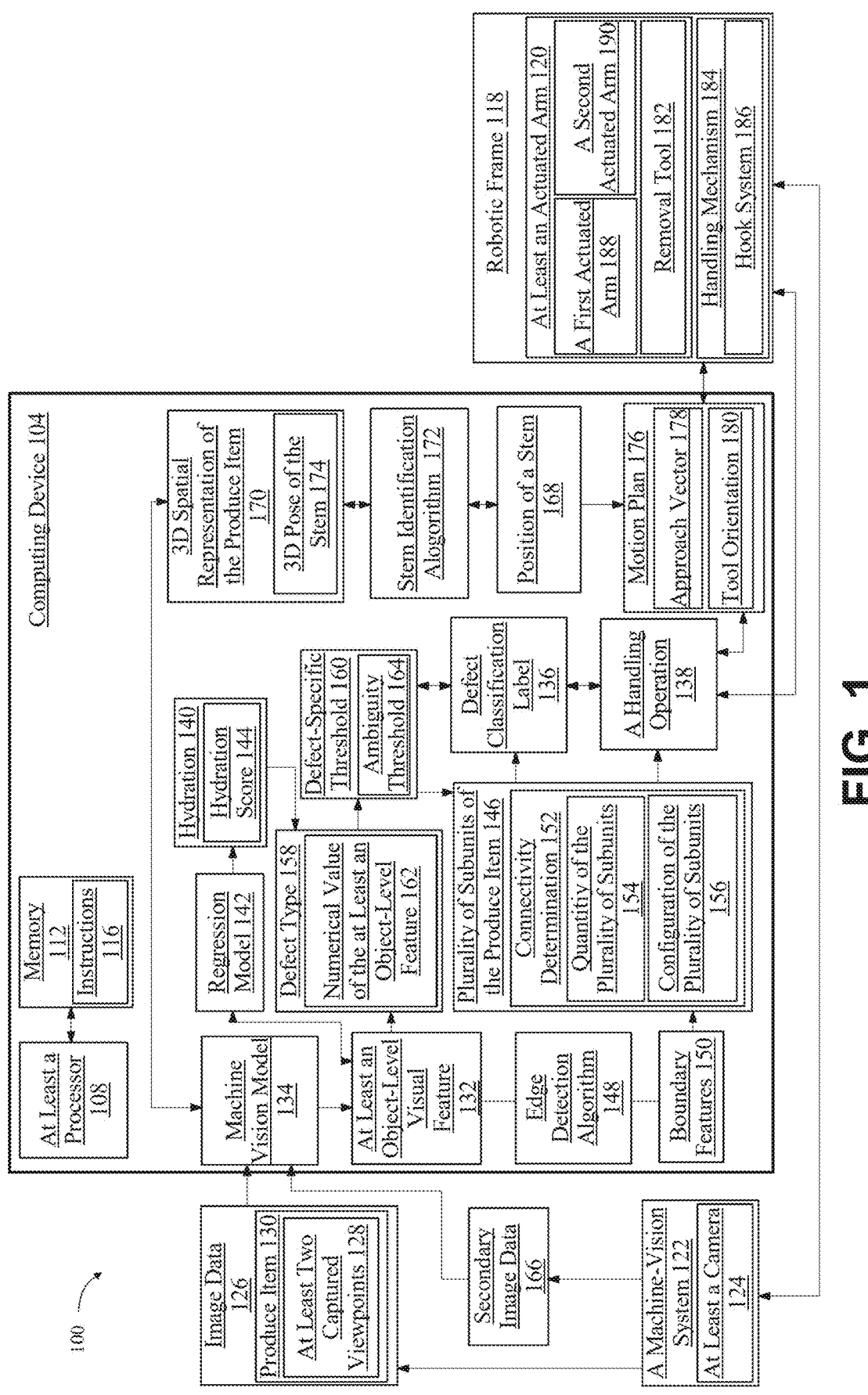
FIG. 1 is a box diagram of an exemplary system for automated produce grading and sorting using machine vision and robotics.

Referring now to FIG. 1, an exemplary embodiment of system 100 for automated produce grading and sorting using machine vision and robotics is illustrated. A "produce item,"

as used herein, is an agricultural product that is grown and harvested for consumption. Non-limiting examples of produce may include fruits, vegetables, herbs, and other plant-based edibles. The term produce item 130 may encompasses both individual items, such as a single tomato, apple, or head of lettuce, and/or aggregated quantities or groupings, such as a bunch of grapes, a bag of carrots, or a case of mixed greens. Produce item 130 may be sold fresh, minimally processed (e.g., washed, trimmed, or packaged), or intended for further processing. While commonly associated with perishable, whole plant foods, the definition of produce item 130 remains flexible to account for a wide variety of crop types, harvest forms, and market presentations.

In continued reference to FIG. 1, for purposes of this disclosure, "produce grading" is the process of evaluating and classifying fruits, vegetables, and other agricultural products based on predefined standards. These predefined standards may include size, shape, color, ripeness, firmness, cleanliness, and absence of defects or damage. The purpose of grading is to ensure quality consistency for consumers and to facilitate pricing, packaging, transportation, and retail presentation. Grading may be conducted manually by trained personnel or with the aid of automated systems incorporating machine vision and artificial intelligence, such as system 100 described herein. For example, tomatoes may be graded using both USDA and commercial grading standards that take into account color stage (breaker, pink, light red, red), firmness (important for transport and shelf life), and visible defects such as skin cracks, scars, and bruises. Tomatoes graded as U.S. No. 1 must be uniform in size and shape, well-colored, and free from decay or serious mechanical injury. U.S. No. 2 tomatoes may exhibit slight imperfections but remain edible and marketable, while combination grades include a mix of No. 1 and No. 2 produce. Apples, by contrast, may be graded on criteria such as surface color (e.g., 50% red blush), diameter, shape symmetry, and the presence of blemishes, bruises, or scabs, with typical grades including U.S. Extra Fancy, U.S. Fancy, U.S. No. 1, and U.S. No. 2. Carrots may be graded based on uniformity of length and diameter, straightness, cleanliness (free from soil), and absence of mechanical or insect damage. Leafy greens such as lettuce or kale may be assessed based on leaf color, freshness, absence of wilting or sliminess, and evidence of pest or harvest tool damage.

With continued reference to FIG. 1, in an embodiment, grading standards may differ by produce type due to the varying structural, physiological, and market characteristics of each crop. For instance, tomatoes may require careful assessment of post-harvest ripening and vulnerability to bruising, whereas apples may be evaluated for color development and pressure sensitivity, and leafy greens may be sensitive to moisture loss and decay. Berries, which are highly perishable, may be required to be inspected rapidly for uniform ripeness and absence of mold or soft spots. In the United States, grading standards are largely set by the U.S. Department of Agriculture (USDA), which publishes official grade standards for dozens of commodities through its Agricultural Marketing Service (AMS). These voluntary standards are widely adopted by growers, distributors, and retailers to meet contractual quality specifications and to support transparent trade practices. In addition, manufacturers and packers must also comply with the regulatory requirements enforced by the U.S. Food and Drug Administration (FDA), including those established under the Food Safety Modernization Act (FSMA). While the FDA does not issue specific quality grades, it mandates that food offered for sale not be adulterated or misbranded, and that handling practices minimize contamination and ensure traceability. As such, companies must weigh USDA grading protocols against FDA food safety regulations, Good Agricultural Practices (GAP), and buyer-specific standards when designing their grading and sorting systems. Modern produce processing operations may also employ proprietary or third-party standards (e.g., GlobalG.A.P., PrimusGFS) to support export certification and quality assurance for premium markets.

In further reference to FIG. 1, in an embodiment, system 100 may include a robotic frame 118 comprising at least an actuated arm 120. For purposes of this disclosure, a "robotic frame" is a structural assembly that supports and houses one or more movable components of a robotic system. Non-limiting examples of one or more movable components may include actuated arms, sensors, tools, and end-effectors. The robotic frame 118 may include a fixed or mobile base, rigid members, rotational or translational joints, and mechanical linkages that provide mechanical stability and enable controlled movement within a defined workspace. In the context of produce grading and sorting, the robotic frame 118 may be positioned at or integrated into a grading station and may define the range and geometry of motion available to its associated actuated components. As used herein, an "actuated arm" is a movable, jointed appendage of a robotic system that is powered by one or more actuators. Non-limiting examples of the one or more actuators may include servo motors, stepper motors, pneumatic cylinders, or hydraulic systems. The at least an actuated arm 120 may be capable of articulated motion along one or more axes (e.g., X, Y, Z, pitch, yaw, roll) and may include rotational and/or linear joints. The at least an actuated arm 120 may be operatively coupled to tools, grippers, or other end-effectors used to interact with produce items 130, such as removal tools 182 or handling mechanisms 184, and may be controlled programmatically based on input from a classification system or machine vision module. For purposes of this disclosure, "operatively coupled" refers to a functional relationship between two or more components, where the components are directly or indirectly connected in a manner that enables them to interact, influence, or coordinate with one another to perform a particular function. The coupling may be, for example and without limitation, mechanical, electrical, pneumatic, hydraulic, software-based, or a combination thereof, and may not require the components to be physically attached, so long as a control or functional linkage is established. For example, a removal tool 182 may be operatively coupled to an at least an actuated arm 120 using a mechanical mount and an electrical interface, allowing the at least an actuated arm 120 to position the tool and transmit control signals for its operation. In another example, a vision system may be operatively coupled to a handling mechanism 184 through a software control module that adjusts the mechanism's behavior based on classification outputs.

In further reference to FIG. 1, in an embodiment, the at least an actuated arm 120 may include a removal tool 182 configured to engage a stem of the produce item 130. For purposes of this disclosure, a "removal tool" is a mechanical end-effector or implement operatively coupled to at least an actuated arm 120. In an embodiment, the removal tool 182 may be configured to detach, excise, or otherwise disengage undesirable components from a produce item 130. Alternatively, and/or additionally, the removal tool 182 may be configured to separate one or more subunits of a produce item 130 from one or more other subunits of the produce item 130. For example, if there is a bunch of a produce item 130 (e.g. bunch of grapes, tomatoes on the vine) the removal tool 182 may be utilized to separate a specified amount of the subunits of the produce item 130 to achieve a certain weight or count for packaging. In an embodiment, the removal tool 182 may include cutting elements (e.g., blades, chisels), gripping components (e.g., clamps, pincers), or abrasion tools, and may be designed to interact with specific anatomical regions of the produce item 130, such as the stem, leaf, or damaged surface area. In certain embodiments, the removal tool 182 may include sensors (e.g., force feedback, pressure sensors) or adjustable gripping param- eters to enable delicate handling of soft or fragile produce item 130. Further, in some cases, the removal tool 182 may operate autonomously based on classification outputs or defect detection models that determine whether removal is necessary and which region of the item should be targeted.

With continued reference to FIG. 1, in some embodi- ments, the removal tool 182 may be constructed from food-safe, corrosion-resistant materials, such as stainless steel (e.g., 420 or 440C grades) for cutting elements, anod- ized aluminum for structural supports, and polymer com- posites for lightweight housings. The selection of materials may depend on the produce type, the required cutting force, and the environmental conditions of the processing facility. For example, high-wear applications involving fibrous stems may utilize hardened steel blades with a non-stick or self- cleaning coating (e.g., PTFE or ceramic-infused coatings) to reduce residue buildup. In certain implementations, the removal tool 182 may include a single-blade chisel mecha- nism, functionally similar to an industrial hose-cutting knife, where a stationary or guided blade is driven through the stem or branch connecting the produce item 130 to a cluster. This configuration may be particularly useful for detaching toma- toes from the vine or segmenting grape bunches with minimal tissue disruption. The blade may be oriented per- pendicularly or at a fixed angle relative to the at least an actuated arm 120 and may include a spring-loaded or pneumatically actuated plunging action to deliver controlled force while minimizing impact to surrounding produce. Additional variants of the removal tool 182 may include oscillating blades, rotary trimmers, or dual-jaw shearing mechanisms, each selected based on desired cutting preci- sion, safety considerations, and mechanical compatibility with the robotic system. In all cases, the materials and design of the removal tool 182 may be selected to comply with applicable food safety standards and withstand repeated sterilization cycles under clean-in-place (CIP) protocols.

With further reference to FIG. 1, as used herein, a "stem" is the portion of a produce item 130 that connects the edible portion of the produce item 130 to its plant of origin or to a cluster of other produce item 130 subunits. In an embodi- ment the stem may include fibrous or woody tissue and may serve as a structural or nutrient transport pathway during growth. In the context of harvested products, the stem may remain attached (e.g., the green calyx and stem of a tomato or pepper) or may be partially removed for aesthetic, func- tional, or processing reasons. The stem may be used as an anchoring point for gripping or removal, particularly in automated systems where the structural integrity of the stem provides a reliable interface for mechanical engagement.

In continued reference to FIG. 1, in an embodiment, the robotic frame 118 may further include a handling mecha- nism 184. For purposes of this disclosure, a "handling mechanism" is a mechanical assembly configured to engage, stabilize, reposition, or transfer produce items 130 within the system. The handling mechanism 184 may include, in a non-limiting example, one or more end-effectors, gripping tools, or repositioning implements, and may be designed to operate based on classification signals, positional com- mands, or inspection outcomes. The handling mechanism 184 may function independently and/or in coordination with other tools such as the removal tool 182 or imaging sensors and may be used to transport produce items 130 between grading, trimming, or disposal zones. For purposes of this disclosure, an "end-effector" is the terminal component of an actuated arm that physically interacts with a produce item 130 to perform a defined task. End-effectors may be fixed or interchangeable, and may include, without limitation: (i) mechanical grippers including parallel or multi-fingered jaws configured to grasp produce items 130 of varying shapes and sizes; (ii) suction-based tools utilizing negative pressure to lift or hold smooth-surfaced produce; (iii) com- pliant or soft robotic actuators designed to conform to irregular geometries and minimize bruising risk; (iv) hook assemblies for puncture-based or edge-contact engagement; and (v) blade-based tools configured for precise excision of stems, leaves, or blemished regions. In certain embodiments, end-effectors may include integrated sensors (e.g., force sensors, pressure transducers, proximity detectors, or visual cameras) to provide feedback during manipulation. End- effector selection or configuration may be determined based on defect classification output, produce type, item orienta- tion, or processing objective, and may be dynamically adjusted through a tool-changing routine.

In continued reference to FIG. 1, in some embodiments, the handling mechanism 184 and associated end-effectors may be fabricated from materials selected to balance strength, flexibility, food safety, and ease of cleaning. For example, rigid components, such as frames, joints, or hook arms, may be constructed from anodized aluminum, stain- less steel (e.g., 316L for food-grade applications), or high- strength polymers (e.g., polycarbonate or PEEK) to provide structural integrity and resist corrosion under washdown conditions. In contrast, contact surfaces of end-effectors that directly engage the produce item 130 may be made from compliant or elastomeric materials, such as silicone rubber, thermoplastic elastomers (TPEs), or polyurethane foams, which may reduce the risk of bruising or tearing soft tissue. In suction-based end-effectors, the contact seal may be made from food-safe silicone or EPDM (ethylene propylene diene monomer) rubber. All material selections may conform to relevant food contact safety regulations, such as FDA 21 CFR Part 177, EU Regulation No. 10/2011, or other appli- cable standards, and may be chosen for compatibility with clean-in-place (CIP) or manual sterilization protocols. In some cases, material selection may vary dynamically across system 100, for instance, with compliant fingertips on a gripper and rigid actuation housings, depending on the sensitivity, weight, or geometry of the produce item 130 being handled. In modular implementations, end-effectors may be mounted using standardized quick-connect cou- plings or magnetic retention systems, with interchangeable contact surfaces designed for specific material requirements or produce types.

In further reference to FIG. 1, in certain embodiments, the materials used in the handling mechanism 184 and end- effectors may further include surface treatments, coatings, or composite formulations to enhance performance and hygiene in a produce-handling environment. For example, anti-microbial coatings such as silver-ion infused polymers, copper-based finishes, or titanium dioxide ($TiO_2$) nanocoat- ings may be applied to contact surfaces to inhibit microbial growth and reduce the risk of contamination between cycles. In applications involving sticky or residue-prone produce (e.g., ripe tomatoes, grapes, or stone fruits), one or more surfaces of the end-effector may be treated with a non-stick coating, such as PTFE (polytetrafluoroethylene), fluoropolymer resins, or ceramic-infused hydrophobic layers, to prevent material adhesion and facilitate rapid cleaning. In embodiments using compliant or soft contact elements, the material properties may be tailored to the expected fragility and geometry of the produce item 130. For instance, silicone rubber used for gripper pads or suction seals may have a Shore A hardness between 10 and 40, allowing for sufficient flexibility to conform to irregular surfaces without inducing pressure points. Higher Shore hardnesses (e.g., 50-70) may be employed for firmer produce or where increased shape retention is required. In some configurations, dual-durometer materials may be used to combine a rigid structural base with a soft-touch gripping interface. Additionally, any material used for components in contact with food may be certified as food-safe in accordance with FDA 21 CFR Part 177, NSF/ANSI Standard 51, EU Regulation No. 10/2011, or equivalent standards, and may be selected for compatibility with automated cleaning systems, CIP (clean-in-place) protocols, or high-pressure washdown environments. Material choice may also be influenced by the expected wear profile, temperature resistance, chemical exposure, and mechanical load during operation.

With further reference to FIG. 1, in some embodiments the handling mechanism 184 may include a hook system 186. As used herein, a "hook system" is a subset of the handling mechanism 184 comprising one or more retractable or articulating hooks configured to engage a portion of the produce item 130 for the purpose of lifting, reorienting, or repositioning. The hooks within the hook system 186 may include curved or pointed ends and may be designed to interact with structurally stable regions of the produce, such as the stem, calyx, or external surface, without compromising the integrity of the produce item 130. In certain embodiments, the hook system 186 may be actuated in coordination with the motion of at least an actuated arm 120 and may include features that enable selective engagement based on the defect status or classification of the produce item 130. For example, the hook system 186 may be configured to selectively engage and reposition the produce item 130 as a function of the defect classification. For purposes of this disclosure, a "defect classification" is the process or result of categorizing a produce item 130 based on the presence, type, and severity of physical or visual defects. Defect classification may distinguish between acceptable and unacceptable produce, and may further assign produce items 130 to intermediate categories, such as "salvageable with trimming," "cosmetically imperfect but edible," or "irreparable and unsuitable for sale." Classification may be performed using machine vision models 134 trained to detect features such as bruising, cracking, discoloration, misshapenness, or foreign matter. The resulting defect classification may inform downstream actions, such as routing the item to a trimming tool, discarding it, or reorienting it for secondary inspection.

Further, the handling mechanism 184 may be operatively coupled to at least an actuated arm 120, such that the motion and function of the handling mechanism 184 are controlled in coordination with the movement of at least an actuated arm 120. In some embodiments, this coupling may be mechanical, electrical, or software-integrated, allowing the handling mechanism 184 to dynamically adjust its position, orientation, and engagement strategy in response to the location, orientation, and classification of the produce item 130. The operative coupling may enable synchronized motion profiles, for example, and without limitation, allowing the at least an actuated arm 120 to extend to a specified region of a conveyor or grading platform while the handling mechanism 184 deploys a hook or gripper to engage the produce item 130 with precision. In certain configurations, the handling mechanism 184 may include a set of responsive joints or linkages that allow it to articulate independently from, or in tandem with, the base movement of the at least an actuated arm 120, enhancing reach and dexterity within constrained environments. These joints or linkages may include, without limitation, one or more revolute joints (enabling rotational movement), prismatic joints (enabling linear extension or retraction), or compliant joints (allowing limited passive flexibility), which together define the arm's kinematic structure and workspace. The handling mechanism 184, when mounted at or near the distal end of at least an actuated arm 120, may follow coordinated motion trajectories that allow it to approach, engage, and manipulate produce items 130 across a multi-dimensional plane.

Control of at least an actuated arm 120 and its associated handling mechanism 184 may be governed by a motion control module implementing closed-loop feedback mechanisms such as Proportional-Integral-Derivative (PID) controllers. These controllers may use sensor input (e.g., joint position encoders, torque sensors, vision-based location estimates) to continuously update actuator commands and ensure precise alignment with the target pose. In certain embodiments, inverse kinematics may be used to compute the joint configurations necessary to move the handling mechanism 184 to a desired spatial location while avoiding obstacles and respecting joint constraints. The result is a flexible, high-precision robotic system capable of adapting to varying produce item 130 geometries and defect profiles. For example, if the defect classification module identifies a produce item 130 with minor surface damage requiring reorientation, the motion control system may calculate the optimal path for the at least an actuated arm 120 to bring the handling mechanism 184 into contact with a designated engagement point, such as the stem or calyx, while simultaneously adjusting grip force, velocity, and angle of approach. In such implementations, the hook system 186 of the handling mechanism 184 may operate under independent control but remain temporally synchronized with the arm's motion through a shared command interface or timing protocol. Additionally, system 100 may support tool-changing routines, where different end-effectors can be automatically mounted to the handling mechanism 184 based on the defect classification output, produce type, or required downstream action (e.g., sorting, trimming, or discarding). In dynamic environments where classification inputs are updated in near real-time (e.g., due to conveyor movement or occlusion correction), the control module may further adapt trajectories mid-cycle to account for revised defect classifications or spatial adjustments.

In some cases, and without limitation, the at least an actuated arm 120 may include a first actuated arm 188, wherein the first actuated arm 188 is operatively coupled to a removal tool 182 and a second actuated arm 190, wherein the second actuated arm 190 is operatively coupled to a handling mechanism 184. The use of dual actuated arms may allow for parallel or sequential operations to be performed on a single produce item 130 or on multiple items within a shared workspace. For example, the first actuated arm 188 may perform targeted actions such as stem removal, trimming of defective regions, or excision of unwanted material using the removal tool 182, while the second actuated arm 190 stabilizes, reorients, or repositions the item using the handling mechanism 184. Each actuated arm may be independently articulated and may include a distinct set of joints, such as revolute, prismatic, or spherical joints, configured to achieve the desired range of motion. In some embodiments, the first actuated arm 188 and the second actuated arm 190 may operate under coordinated control using a shared motion planning system that ensures collision avoidance, task synchronization, and spatial cooperation. For instance, the system may employ a master-slave control architecture or a centralized trajectory optimization module to dynamically assign tasks between the two arms based on the defect classification, item orientation, or line throughput requirements. In one example, a tomato identified as having a minor stem defect may be held steady by the second actuated arm 190 using a compliant hook or gripper while the first actuated arm 188 positions the removal tool 182 to excise the stem with precision. The handling mechanism 184 may then rotate or transfer the item to a downstream station without requiring a regrip or re-inspection, thereby improving cycle time and reducing cumulative handling. In some embodiments, the first actuated arm 188 and the second actuated arm 190 may share a common base or be mounted on separate linear tracks to allow for adjustable positioning along the grading line. This modular dual-arm configuration may enhance system flexibility and enable more complex manipulation sequences, particularly in cases involving delicate, asymmetrical, or clustered produce items 130.

In further reference to FIG. 1, in additional embodiments, system 100 may include more than two actuated arms, such as three, four, or more arms, each configured to perform specialized or coordinated tasks within the grading and sorting workflow. These arms may be mounted to a shared robotic frame 118 or distributed across multiple independent bases, allowing for greater flexibility in spatial arrangement and workflow integration. For example, a first pair of arms mounted on a fixed base may handle defect detection and trimming, while a second pair of arms mounted on a mobile gantry or parallel processing lane may perform sorting, repositioning, or packaging tasks. Each arm may be assigned a dedicated function, such as removal, stabilization, rotation, or transfer, or may operate as part of a redundant or load-balancing subsystem depending on throughput demands. In some configurations, actuated arms on separate bases may communicate using a centralized control unit to coordinate timing, object hand-off, and collision avoidance. This modular and scalable architecture may enable system 100 to accommodate varying production volumes, adapt to different produce types, or be deployed across multiple processing stations within a high-throughput grading facility. In this manner, the disclosed system architecture provides a scalable and task-adaptable robotic frame 118 suitable for diverse produce-handling applications, from delicate trimming to high-speed sorting in industrial agricultural environments.

In further reference to FIG. 1, in an embodiment, system 100 may include a machine-vision system 122 communicatively connected to computing device 104. In an embodiment, the machine-vision system 122 may include at least a camera 124. As used in this disclosure, a "camera" is a device that is configured to sense electromagnetic radiation and generate an image representing the electromagnetic radiation. In some cases, at least a camera 124 may include one or more optics. Exemplary non-limiting optics include spherical lenses, aspherical lenses, reflectors, polarizers, filters, windows, aperture stops, and the like. In some cases, at least a camera 124 may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, at least a camera 124 may be sensitive within a non-visible range of electromagnetic radiation, such as without limitation infrared. As used in this disclosure, "image data" is information representing at least a physical scene, space, and/or object. In some cases, image data 126 may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively, where "image" is used as a verb, in this disclosure, it refers to generation and/or formation of an image.

With further reference to FIG. 1, a machine-vision system 122 may use images from at least a camera 124, to make a determination about a scene, space, and/or object. For example, in some cases a machine-vision system 122 may be used for world modeling or registration of objects within a space. In some cases, registration may include image processing, such as and without limitation, object recognition, feature detection, edge/corner detection, and the like. Non-limiting examples of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine-vision system 122 may use a classifier, such as any classifier described throughout this disclosure.

With further reference to FIG. 1, the at least a camera 124 may be configured to capture image data 126 of one or more produce items 130 as they pass through an inspection zone or are manipulated by at least an actuated arm 120. The machine-vision system 122 may include additional optical components, such as lenses, filters, illuminators (e.g., LED arrays or structured light sources), and optical diffusers, configured to enhance image quality and uniformity across varying produce types, lighting conditions, and surface textures. These components may be particularly useful for mitigating challenges such as glare from shiny produce surfaces, low-contrast edges, or shadows cast by stems or neighboring items, thereby improving segmentation and classification accuracy. In some embodiments, system 100 may further include multiple cameras positioned at different viewpoints (e.g., top-down, side, or oblique angles) or arranged stereoscopically to generate three-dimensional visual data of each produce item 130. Such an example may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera is TaraXL from e-con Systems, Inc of San Jose, California. TaraXL is a USB 3.0 stereo-camera which is optimized for NVIDIA® Jetson AGX Xavier™/ Jetson™ TX2 and NVIDIA GPU Cards. TaraXL's accelerated Software Development Kit (TaraXL SDK) is capable of doing high quality 3D depth mapping of WVGA at a rate of up to 60 frames per second. TaraXL is based on MT9V024 stereo sensor from ON Semiconductor. Additionally, TaraXL includes a global shutter, houses 6 inertial measurement units (IMUs), and allows mounting of optics by way of an S-mount lens holder. TaraXL may operate at depth ranges of about 50 cm to about 300 cm.

Still referring to FIG. 1, an exemplary machine vision camera that may additionally be included in machine-vision system 122 is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

In further reference to FIG. 1, an exemplary range-imaging camera that may be included in machine-vision system 122 is Intel® RealSense™ D430 Module, from Intel® of Mountainview, California, U.S.A. D430 Module comprises active infrared (IR) illumination and a stereoscopic camera, having global shutters and frame rate of up to 90 fps. D430 Module provides a field of view (FOV) of 85.2° (horizontal) by 58° (vertical) and an image resolution of 1280×720. Range-sensing camera may be operated independently by dedicated hardware or, in some cases, range-sensing camera may be operated by computing device 104. In some cases, range-sensing camera may include software and firmware resources (for execution on hardware, such as without limitation dedicated hardware or a computing device). D430 Module may be operating using software resources including Intel® RealSense™ SDK 2.0, which include opensource cross platform libraries.

In continued reference to FIG. 1, the machine-vision system 122 may be configured to output one or more image streams or still frames to computing device 104, where such data may be processed using image analysis algorithms, defect detection models, or classification networks. In some implementations, the machine-vision system 122 may include an onboard image processing module that pre-processes image data 126 (e.g., by performing denoising, edge enhancement, or segmentation) before transmitting metadata or feature maps to computing device 104 for higher-level decision-making. The connection between the machine-vision system 122 and computing device 104 may be wired (e.g., USB, Ethernet, or industrial fieldbus) or wireless (e.g., Wi-Fi or Bluetooth), depending on system configuration and processing load distribution. The output of the machine-vision system 122 may include, without limitation, bounding boxes, depth maps, defect labels, quality scores, object orientations, stem locations, or subunit counts, all of which may be used to inform downstream actions performed by the at least an actuated arm 120, removal tools 182, or handling mechanisms 184.

In continued reference to FIG. 1, system 100 may include circuitry such as without limitation at least a processor 108 communicatively connected to a memory 112, the memory 112 containing instructions 116 configuring the at least a processor 108 to complete one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In further reference to FIG. 1, in an embodiment, at least a processor 108 may be configured to receive image data 126 from at least a camera 124. In an embodiment, the image data 126 may include at least two captured viewpoints 128 of a produce item 130. As used herein, a "viewpoint" is the spatial location and orientation of a camera relative to a target scene, object, or region of interest at the time of image acquisition. Each viewpoint may provide a distinct visual perspective of the same produce item 130, and multiple viewpoints may be used to infer depth, detect occluded features, or improve classification accuracy. Viewpoints may be generated by capturing images from different fixed camera positions, by repositioning a movable camera (e.g., on a robotic arm), or by rotating the object within the field of view. In an embodiment, at least a processor 108 may receive image data 126 as a continuous video stream or as a series of still frames, which may be timestamped and optionally tagged with metadata such as camera ID, spatial location, illumination state, or acquisition parameters (e.g., exposure, focal length, or filter setting). In embodiments where multiple viewpoints are used, such as in stereoscopic or multi-angle systems, at least a processor 108 may be configured to align or register the multiple viewpoints to reconstruct a partial or complete 3D representation of the produce item 130. This representation may be in the form of a point cloud, depth map, volumetric mesh, or voxel grid, and may be used to estimate object pose, detect surface abnormalities, and identify structural features such as stems, calyxes, or clustered regions.

In continued reference to FIG. 1, in an embodiment, at least a processor 108 may execute one or more pre-processing operations on the received image data 126, including without limitation: normalization, contrast enhancement, deblurring, background subtraction, and color-space conversion. Following pre-processing, at least a processor 108 may be configured to extract features from the image data 126 using traditional computer vision algorithms (e.g., edge detection, corner detection, blob analysis) and/or apply trained machine learning models, such as convolutional neural networks (CNNs) or transformer-based architectures, to perform semantic segmentation, object classification, and defect scoring. In an embodiment, system 100 may apply multi-view feature fusion, wherein the extracted features from each viewpoint are combined to improve accuracy in classification, size estimation, or quality scoring. Based on the analysis of the image data 126, at least a processor 108 may generate one or more control outputs, such as spatial coordinates of a detected defect, orientation vectors of the produce item 130, or a classification label (e.g., "salvageable," "discard," or "ready for packaging"). These outputs may be used to direct downstream system components, including at least an actuated arm 120, removal tools 182, or sorting mechanisms, to take specific actions with respect to the identified produce item 130. In some implementations, at least a processor 108 may also log these outputs along with associated metadata for quality control, traceability, or feedback-driven model refinement.

With continued reference to FIG. 1, in an embodiment, at least a processor 108 may be configured to extract at least an object-level visual feature 132 from the image data 126 using a machine vision model 134. For purposes of this disclosure, an "object-level visual feature" is a characteristic or property associated with a specific object instance. This is as opposed to background elements or aggregate image statistics. Such features may include, without limitation, object contours, surface curvature, dimensions, stem location, shape category, defect location, segmentation masks, or classification labels. These features may be computed after the object of interest is isolated from the surrounding image data 126 and are used to inform downstream manipulation, grading, sorting, or removal decisions. As used herein, a "machine vision model" is a set of algorithms, rules, or trained neural networks that receive image data 126 as input and produce structured information as output. Machine vision models 134 may be handcrafted (e.g., using edge detection filters and geometric heuristics) or learned (e.g., through supervised training of convolutional neural networks, vision transformers, or segmentation models). The machine vision model 134 may operate on 2D or 3D input data and may be executed locally by at least a processor 108 or distributed across one or more processing units. The output of the machine vision model 134 may include a single object-level visual feature 132 or a structured collection of such features for each identified object in a scene.

In one embodiment, at least a processor 108 may form a point cloud from the received image data 126, such as from stereoscopic camera input or a structured light sensor. A point cloud may include a set of discrete spatial points, each defined by a 3D coordinate (x, y, z) and optionally additional attributes such as color (RGB), surface normal vectors, or intensity. At least a processor 108 may apply nearest-neighbor clustering or region growing algorithms to group points that correspond to a single object and may then calculate object-level visual features 132 such as centroid position, size, or orientation. A machine vision model 134 may further process the point cloud to extract features like surface curvature, stem protrusion, or defect cavities, all of which can be derived from local point density, shape descriptors (e.g., spin images, FPFH), or convexity analysis.

In another embodiment, at least a processor 108 may derive a depth map from two or more viewpoints or using a depth-sensing modality (e.g., time-of-flight or stereo disparity). A depth map is a 2D array where each pixel encodes the distance from the camera to the nearest surface at that image location. At least a processor 108 may register the depth map to the RGB image to obtain a combined RGB-D representation, which allows for depth-aware segmentation and defect detection. object-level visual features 132 may be extracted by applying foreground-background segmentation to the depth map, followed by connected-component analysis to isolate individual produce items 130. Edge-based features (e.g., ridges, corners, and boundaries) may be detected using techniques such as Canny edge detection, Sobel filters, or depth gradient analysis, enabling at least a processor 108 to infer object outlines and surface topology.

In some cases, at least a processor 108 may generate a volumetric mesh, such as a triangular or quadrilateral surface mesh, by connecting adjacent depth or point cloud values into a 3D surface structure. This mesh may be smoothed using Laplacian smoothing or refined using marching cubes algorithms to fill in gaps and create a more complete geometric representation. A mesh-based machine vision model may calculate object-level visual features 132 such as surface area, asymmetry, or feature curvature, which are useful in identifying irregular produce or structural deformities. Mesh features may also support texture analysis by mapping high-resolution imagery onto the mesh surface and identifying visual artifacts like bruises or discoloration.

In other embodiments, the image data 126 may be converted into a voxel grid, wherein the 3D space surrounding the produce item 130 is divided into discrete volumetric elements ("voxels") that are either occupied or empty. Voxels may be derived from depth maps or fused multi-view imagery using volumetric integration techniques such as truncated signed distance functions (TSDFs). A machine vision model 134 may process this voxel grid to identify internal structures or dense regions that correlate with known defect patterns (e.g., hollow cores, embedded bruises). object-level visual features 132 extracted from voxel data may include volumetric footprint, center of mass, or internal void estimates.

In addition to geometric representations, object-level visual features 132 may also be extracted using semantic or instance segmentation models, which may classify each pixel (or voxel) in the image according to its object identity or class label. For example, a U-Net or Mask R-CNN architecture may be used to generate per-pixel masks for each produce item 130, delineating stem regions, skin, damaged areas, and background. From these masks, at least a processor 108 may compute region properties such as area, perimeter, aspect ratio, shape irregularity, or color variance, all of which contribute to grading and sorting decisions.

In yet another example, at least a processor 108 may perform blob detection using techniques such as Laplacian of Gaussian (LoG) or Difference of Gaussians (DoG) to identify regions of uniform intensity surrounded by contrasting boundaries. This approach may be used to detect features such as spots, bruises, or embedded mold, especially in produce items 130 with relatively smooth or homogeneous surfaces. Blob size, shape, and density may be used as object-level visual features 132 that correlate with spoilage or downgrading thresholds. Each of the above representations, point clouds, depth maps, meshes, voxel grids, and segmented masks, may be independently or jointly analyzed by the machine vision model 134 to yield object-level visual features 132. These features may then be used by at least a processor 108 to generate output data used in sorting, trimming, packaging, or rejection decisions, as described in further detail below.

With further reference to FIG. 1, in some embodiments, extracted edge maps or segmentation masks may be further analyzed to detect individual subunits within a produce item 130, such as grapes on a vine or tomatoes on a stem cluster. As used herein, a "subunit" is a visually or physically distinguishable component of a grouped or clustered produce item 130. For example, and without limitation such as an individual grape on a bunch, a tomato on the vine, or a pepper on a stem. In an embodiment, detecting the plurality of subunits of the produce item 146 may include applying one or more edge detection algorithms 148 (e.g., Canny, Sobel, or Laplacian filters) to the image data 126 to identify discontinuities or contour boundaries that visually separate each subunit from adjacent structures or background elements. In some embodiments, the output of the edge detection step may be passed through morphological filters or thresholding operations to remove noise and reinforce contiguous boundaries. For example, dilation and erosion may be used to solidify outlines, while connected-component analysis or blob detection (e.g., Difference of Gaussians, Laplacian of Gaussian) may be used to localize individual subunit regions based on size and shape criteria.

In some cases, the connectivity analysis may involve graph-based methods or skeletonization techniques that reduce detected boundaries into nodes and edges to infer topological relationships between subunits. For instance, a vine with multiple tomatoes may be modeled as a tree structure where each fruit is a node connected to a shared stem path. This structural information may be encoded in a spatial data structure (e.g., region adjacency graph or voxel map) and used to support downstream operations such as selective removal, trimming of specific subunits, or weight-based batching for packaging. In other embodiments, machine learning models trained to classify subunit arrangements may be used in conjunction with visual features to refine subunit counts and locations. This enables system 100 to robustly analyze clustered produce configurations and adapt its handling and sorting behavior based on the detected subunit profile.

Further, in an embodiment, detecting the plurality of subunits of the produce item 146 may include determining, as a function of the boundary features 150, a connectivity determination 152 including one or more of a quantity of the plurality of subunits 154 and configuration of the plurality of subunits 156. For purposes of this disclosure, a "boundary feature" is a characteristic or attribute in an image or dataset that indicates the edge or separation between distinct regions, objects, or subcomponents. As used herein, a "connectivity determination" is the process of analyzing spatial, geometric, or topological relationships between distinct regions or features within image data 126 to identify how individual subunits are arranged, grouped, or physically linked to one another. In some embodiments, the boundary features 150 may be derived from earlier segmentation or edge detection operations and may be processed to isolate closed contours, concavity regions, or saddle points that signify separation between neighboring subunits. A quantity of the plurality of subunits 154 determination may involve counting the number of detected discrete regions or blobs that satisfy size, shape, and continuity thresholds corresponding to expected subunit dimensions. For example, in a bunch of grapes, the system may count a set of high-circularity blobs clustered around a common branch, while for cherry tomatoes on a vine, the system may identify bulbous protrusions spaced at relatively regular intervals along a stem.

A configuration determination, by contrast, may include mapping how these subunits are oriented relative to one another and to the main body of the produce item 130, such as whether the subunits are linearly aligned, radially distributed, or arranged in a tiered cluster. In some implementations, configuration determination may involve constructing a graph model or spatial tree wherein nodes represent individual subunits and edges represent inferred physical or visual links (e.g., shared stems, adjacency, continuity). This analysis may also incorporate angular spacing, inter-subunit distance, or alignment with a structural feature (such as a central axis or stem) to classify the grouping pattern. In certain cases, the connectivity determination 152 may be used to differentiate between produce items 130 that exhibit similar visual characteristics but differ in structural arrangement. For example, tomatoes growing in truss formations may be distinguished from cherries in a tight spherical bunch based on their connectivity graphs. This may enable more precise classification, selective manipulation of subunits, or validation of packaging constraints (e.g., predefined cluster sizes or shape tolerances). Additionally, connectivity metrics such as cluster density, centroid dispersion, or inter-subunit bond length may be quantified and passed downstream as part of the object-level feature vector used to drive sorting, grading, or trimming operations.

With continued reference to FIG. 1, in some embodiments, the machine vision model 134 may be trained using a dataset of labeled image data 126, where each sample is annotated with one or more ground truth object-level visual features 132, such as defect location, object class, or stem position. Training may involve supervised learning using techniques such as backpropagation and stochastic gradient descent and may employ architectures such as convolutional neural networks (CNNs), U-Nets, or attention-based vision transformers. The dataset may include a wide range of produce types, lighting conditions, occlusion scenarios, and orientations to ensure generalizability across multiple use cases and environmental conditions. In certain embodiments, model training may occur in multiple stages, where an initial model is trained broadly across a diverse produce dataset to capture general visual patterns, such as common shape geometries, surface textures, and defect types 158, and then fine-tuned or adapted for a specific type of produce (e.g., tomatoes, peppers, grapes, citrus) using smaller, focused datasets. This tiered approach may allow a general-purpose feature extractor to be retained while only updating a task-specific classification head or may involve retraining deeper layers of the model to learn nuanced, produce-specific cues. For example, a model fine-tuned on tomatoes may learn to recognize subtle color variations and stem splits as defect indicators, while a grape-specific model may focus on cluster tightness, dehydration signs, or stem retention.

During inference, system 100 may select a produce-specific model variant based on context, metadata (e.g., batch ID or source), or a preliminary classification stage. In some implementations, a general-purpose base model may first detect and segment produce items 130, and a more specialized model may then perform grading, defect detection, or pose estimation tailored to the detected produce type. This hierarchical model selection strategy may allow system 100 to balance general applicability with domain-specific accuracy, thereby improving detection precision, minimizing false positives, and supporting automated decisions across a wide range of produce varieties. During operation, the machine vision model 134 may generate a feature vector for each detected object, comprising normalized values for various visual descriptors (e.g., size, shape, curvature, defect likelihood). These vectors may be standardized or normalized using z-score normalization, min-max scaling, or principal component analysis (PCA) to ensure that different features contribute proportionally to downstream decisions.

To address environmental variability, such as poor lighting, glare, or partial occlusion, system 100 may implement one or more error correction or uncertainty handling mechanisms 184. For example, when occlusion is detected, such as when a portion of a produce item 130 is obscured by another object, system 100 may trigger reimaging from an alternate viewpoint or invoke a pose estimation algorithm to infer the hidden structure based on known geometric priors or historical shape models. In cases of inconsistent lighting or shadows, at least a processor 108 may apply illumination-invariant preprocessing (e.g., histogram equalization or Retinex filtering) to normalize input data before feature extraction. Confidence scores may be generated for each extracted feature, and low-confidence outputs may be flagged for secondary review, passed through a fallback classification model, or used to dynamically reweight control decisions. In certain embodiments, historical data, including prior classifications or object trajectories, may be cached and used to resolve ambiguity during real-time decision making. This approach may enable robust, adaptive processing across a wide range of produce handling scenarios, while also supporting model refinement over time through semi-supervised or continual learning.

With further reference to FIG. 1, in some embodiments, system 100 may support dynamic model refinement based on performance feedback, misclassifications, or changing environmental or crop conditions. During operation, instances where classification confidence falls below a threshold, or where downstream validation (e.g., human audit or quality sensor feedback) identifies incorrect grading, may be flagged and stored as part of a model retraining queue. These flagged samples, along with their associated image data 126, feature vectors, and metadata (e.g., time of day, lighting conditions, produce type), may be aggregated to form a supplemental training dataset. This dataset may be used to periodically retrain or fine-tune one or more models using offline batch learning, incremental (online) learning, or semi-supervised techniques where ground truth labels are inferred or sparsely provided. In this way, the machine-vision system 122 may evolve over time to better accommodate seasonal changes in produce appearance, new defect types 158, or shifts in lighting or imaging hardware.

To support scalable and responsive inference, system 100 may further implement a hybrid processing architecture in which machine vision models 134 are selectively deployed at the edge (e.g., onboard processors or embedded systems near the grading line) or in the cloud (e.g., remote servers or centralized data centers). Edge-based inference may be preferred for low-latency, real-time operations, such as controlling at least an actuated arm 120 or triggering sorting gates, while cloud-based inference may be used for computationally intensive tasks, periodic batch reclassification, or fleet-wide model updates. In some implementations, initial object detection and feature extraction may occur at the edge, while raw or compressed feature vectors are transmitted to a cloud service for classification, scoring, or long-term storage. Conversely, lightweight classifiers may be downloaded from the cloud and deployed to edge devices as part of a model distribution and versioning system, enabling coordinated updates across geographically distributed facilities. Version control, model performance metrics, and rollback options may be maintained through a central orchestration layer to ensure reliability and traceability in environments requiring regulatory compliance or quality assurance auditing.

In further reference to FIG. 1, in some embodiments, system 100 may include a model governance framework configured to manage the lifecycle, performance, and traceability of machine vision models 134 deployed across system 100. Each model version may be uniquely tagged with a version identifier and associated metadata, such as training dataset origin, architecture type, training parameters, accuracy metrics, and deployment history. Performance monitoring tools may be used to log metrics such as precision, recall, inference time, and misclassification rates across different classes or produce types. This information may be stored in a model registry or audit database, enabling system operators to track how model performance evolves over time and to identify when retraining or rollback is necessary. In regulated or high-sensitivity applications, system 100 may include a human-in-the-loop (HITL) oversight layer configured to review edge cases, validate proposed model updates, or intervene when classification decisions fall below a predefined confidence threshold. For example, a subset of low-confidence or high-impact decisions, such as those involving high-value produce or ambiguous defect cases, may be routed to a human reviewer, who may confirm, override, or annotate the decision. These human-labeled review samples may then be reintroduced into the training pipeline to improve model robustness through supervised fine-tuning. In some cases, system 100 may also enforce approval workflows in which any model update, particularly those that impact routing thresholds, quality control logic, or grading rules, must be validated and authorized before deployment. This ensures operational transparency, safeguards product quality, and supports compliance with industry-specific standards or traceability requirements.

In additional embodiments, system 100 may support personalization or contextual tuning of machine vision models 134 based on facility-specific parameters, produce source, or customer-defined grading criteria. For example, different processing facilities may apply different defect sensitivity thresholds based on regional quality expectations, harvest conditions, or end-market requirements (e.g., fresh market vs. processing). In such cases, system 100 may deploy a shared base model across all facilities but allow for local calibration of model parameters, decision thresholds, or post-processing logic through configuration files or tuning datasets. Similarly, model behavior may be adapted at the batch level, wherein metadata associated with a specific shipment, such as farm origin, crop variety, or season, triggers the selection of a tailored model variant or reweights feature importance (e.g., placing greater emphasis on stem visibility for vine crops or cluster tightness for grapes). In customer-driven contexts, system 100 may integrate custom quality profiles, enabling the classification output or routing behavior to align with predefined buyer specifications, branding standards, or packaging requirements. This personalization capability may ensure that the machine-vision system 122 remains flexible and commercially adaptable, while maintaining the performance and generalization benefits of a centralized model training infrastructure.

In further reference to FIG. 1, in an embodiment, at least a processor 108 may be configured to assign a defect classification label 136 to the produce item 130 as a function of the at least an object-level feature. For purposes of this disclosure, a "defect classification label" is a data object, tag, or metadata value generated by the system to represent defect data associated with a produce item. In an embodiment, the defect data may represent a presence, type, severity, and/or location of a detect associated with a produce item 130. As described above, the object-level visual feature 132 may include one or more quantitative or qualitative descriptors, such as curvature, discoloration, boundary irregularity, or depth deviation. In an embodiment, at least a processor 108 may evaluate these features individually or as part of a multidimensional feature vector and may use rule-based logic, machine-learned classifiers, or hybrid systems to assign a defect classification label 136 to each object instance. The defect classification label 136 may indicate the quality status or processing pathway for the produce item 130 (e.g., "acceptable," "requires trimming," "cosmetically defective," "discard"), and may optionally include a severity level or sub-class corresponding to a known defect type 158.

In an embodiment, assigning a defect classification label 136 to the produce item 130 may further include identifying a defect type 158 as a function of the at least an object-level visual feature 132. For purposes of this disclosure, a "defect type" is a specific, identifiable category of physical imperfection, damage, or undesirable variation associated with a produce item 130 that may affect its quality, grade, appearance, safety, or marketability. In an embodiment, a defect type 158 may be visible on the surface, such as a discoloration or crack; detectable through 3D geometric analysis, such as a dent or abnormal curvature; or inferred from spectral or colorimetric properties, such as mold or dehydration not easily seen with standard RGB imaging. Non-limiting examples of defect types 158 may include bruising, typically characterized by localized depressions and darker coloration; mold, appearing as irregular blobs or high-contrast regions with distinctive texture or spectral response; skin breakage, identified by linear surface discontinuities or edge deformation; shriveling, which may present as high-frequency undulations or a loss of surface tautness; discoloration, including hue, brightness, or saturation deviations associated with conditions such as sunscald or overripeness; foreign matter, such as stems, leaves, insects, or debris that do not belong to the produce item 130; and stem detachment, representing partial or complete separation of the stem from the item body, often associated with spoilage risk or handling defects. In some embodiments, defect types 158 may be predefined by system 100, for example through a configuration file, reference database, or quality grading standard, and in other embodiments may be introduced or updated dynamically based on user input, adaptive model training, or calibration to reflect evolving grading criteria, seasonal quality profiles, or specific buyer requirements. The identified defect type 158 may be used to guide not only classification but also downstream system responses, including sorting, trimming, quality scoring, or diversion to a secondary processing workflow.

Further, in an embodiment, assigning the defect classification label 136 to the produce item 130 may include comparing the at least an object-level visual feature 132 to a defect-specific threshold 160. For purposes of this disclosure, a "defect-specific threshold" is a criterion used to determine whether a particular object-level visual feature 132 indicates the presence, absence, or severity of a specific defect type 158. The defect-specific threshold 160 may be numeric, categorical, or statistical, and defines a boundary above, below, or around which a feature value is interpreted as indicative of a particular defect condition. For example, a surface concavity depth greater than 1.5 mm may indicate bruising in tomatoes, while a color saturation threshold below 0.35 may suggest dehydration or sunscald. A blob count of three or more discrete regions within a defined surface area may be interpreted as indicative of mold or foreign surface contamination. An edge discontinuity length greater than 8 mm may be used to detect skin breakage or cracking, while a wrinkle frequency, measured as the number of curvature zero-crossings per millimeter, may suggest shriveling. In other cases, a stem detection confidence score below 0.65 may trigger a stem-detachment classification. In some embodiments, thresholds may be static, defined by pre-established quality standards or empirical benchmarks; in other embodiments, thresholds may be dynamically adjusted, probabilistically modeled, or learned from labeled datasets specific to the produce type, seasonal variation, batch conditions, or downstream quality requirements. Multiple thresholds may be evaluated in combination using decision trees, rule-based systems, or multi-dimensional classifiers, allowing the system to resolve ambiguous or overlapping defect presentations through logical inference or statistical modeling. These thresholds play a critical role in converting raw object-level visual features 132 into actionable classifications and support consistent and automated grading outcomes across diverse operational scenarios.

In an embodiment, assigning the defect classification label 136 to the produce item 130 may further include outputting the defect classification label 136 as a function of comparing the at least an object-level visual feature 132 to a defect-specific threshold 160. Once at least a processor 108 has completed the comparison between the extracted feature and the corresponding defect-specific threshold 160, whether static, dynamic, or learned, the result of that comparison may be used to generate a structured output label that represents the interpreted condition of the produce item 130. The defect classification label 136 may include a categorical designation (e.g., "bruised," "acceptable," "requires trimming," "discard"), and may optionally include sub-labels or metadata such as confidence score, severity level, or detected defect type 158. In certain embodiments, the output label may be embedded within a data structure that is indexed to the image data 126, timestamp, object identifier, or spatial coordinates of the produce item 130, thereby enabling downstream control modules to take targeted actions. Outputting the classification label may also trigger updates to item tracking records, initiate actuation commands, or log quality control data for audit and reporting purposes. This labeling step represents the culmination of the feature evaluation pipeline and establishes a machine-interpretable decision that can drive further automation within the system.

Still referring to FIG. 1, in some embodiments, outputting the defect classification label 136 may include generating a multi-label output or a composite grading designation for a single produce item 130. A multi-label output may include the identification of two or more defect types 158 simultaneously present on the same item (e.g., "bruised" and "stem-detached"), along with corresponding severity metrics or location tags. In other embodiments, system 100 may assign a composite grade, such as "Grade B" or "Trim Required," based on the aggregation of multiple object-level visual features 132 and their respective comparisons to multiple defect-specific thresholds 160. These composite grades may be derived using a weighted scoring function, rule-based aggregation logic, or a machine-learned grading model trained to emulate human inspectors. The composite output may also incorporate context-specific criteria such as batch parameters, customer quality profiles, or downstream application (e.g., fresh sale versus processing). The defect classification label 136, whether single, multi-label, or composite, may be stored in association with the original image data 126, object identifier, and system timestamp, thereby creating a persistent record for each processed item. This data may be logged into a quality assurance system, used for real-time analytics dashboards, or exported for external compliance reporting or buyer documentation. In certain embodiments, classification results may be aggregated across multiple items or time intervals to calculate facility-level quality metrics such as defect frequency, false rejection rates, or grading consistency. These aggregated insights may be used to trigger alerts, adjust threshold parameters, retrain machine vision models 134, or inform operational decisions such as line speed adjustments or upstream harvesting recommendations. In this way, outputting the defect classification label 136 serves not only to guide real-time automation, but also to populate a continuous feedback loop for quality optimization, traceability, and data-driven system refinement.

In continued reference to FIG. 1, in an embodiment, assigning the classification label may further include generating a numerical value of the at least an object-level feature 162. The numerical value may quantify a specific aspect of the produce item's 130 visual condition, such as the area of surface bruising, the number of detected blobs indicating contamination, the depth of a concavity, or the degree of color variance. This quantification step may translate raw image data 126 or segmented visual patterns into a scalar or statistical representation that can be evaluated against one or more classification thresholds. For example, a concavity depth may be expressed in millimeters, a blob count as an integer, or a color variance score as a floating-point value on a normalized scale.

Further, in an embodiment, assigning the classification label may include comparing the numerical value of the at least an object-level feature 162 with an ambiguity threshold 164 corresponding to a defect type 158. For purposes of this disclosure, an "ambiguity threshold" is a numerical or statistical boundary within a predefined uncertainty range for a given defect-specific feature, below or above which a defect classification may be deemed inconclusive or inde- terminate. Ambiguity thresholds 164 may be used to detect feature values that fall into a "gray zone," where the observed condition may or may not constitute a defect depending on other factors such as lighting, orientation, or produce variety. For example, a bruising depth between 0.8 mm and 1.2 mm may be considered ambiguous for certain tomato varieties, too deep to be definitively acceptable, but not deep enough to confidently trigger a discard classifica- tion.

Continuing, in an embodiment, assigning the defect clas- sification label 136 to the produce item 130 may further include capturing, as a function of comparing the numerical value of the at least an object-level visual feature 132 with the ambiguity threshold 164, secondary image data 166 of the produce item 130. When the feature value falls within the ambiguity range (e.g., near or between two threshold bound- aries) system 100 may initiate a secondary image capture routine, which may involve imaging the produce item 130 from a different vantage point, under different lighting conditions, or using a different sensing modality such as near-infrared, hyperspectral imaging, or structured light. This secondary image data 166 may clarify the ambiguous condition and improve the confidence of the resulting clas- sification.

In an embodiment, identifying the defect type 158 may further include re-evaluating the at least an object-level visual feature 132 using the secondary image data 166 to refine the defect classification. In an embodiment, system 100 may recalculate or augment the original feature vector using the secondary image data 166, apply an updated or more sensitive model, or compute additional metrics derived specifically from the secondary view (e.g., changes in sur- face reflectivity, triangulated shape deviation, or multi-angle defect continuity). The refined object-level visual feature 132 may then be re-compared to the original or adjusted thresholds, enabling system 100 to resolve ambiguity and assign a final classification label with higher certainty. In some cases, this refinement process may also involve the use of ensemble classifiers or a fallback human-in-the-loop system to confirm the output.

Still referring to FIG. 1, in an embodiment, if the re- evaluation process using secondary image data 166 fails to resolve the ambiguity, such as when the object-level visual feature 132 remains within a defined ambiguity threshold 164 or when classification confidence remains below a predetermined confidence threshold, system 100 may initi- ate an exception processing routine. For purposes of this disclosure, exception processing refers to an automated or semi-automated workflow that is triggered when standard classification procedures fail to yield a confident or defini- tive result. In some cases, the exception processing routine may include capturing tertiary image data, such as high- resolution stills, multispectral imagery, or extended frame sequences under varied lighting. In other cases, the routine may include routing the produce item 130 to a designated exception handling zone for manual inspection or human- in-the-loop (HITL) review. For example, a tomato that repeatedly triggers a borderline stem detachment score may be directed to a manual grading station, where an operator can make a visual determination based on tactile feedback or downstream use-case requirements. Additionally, system 100 may flag the item's data for long-term logging and analysis. In certain embodiments, system 100 may assign an intermediate classification label, such as "uncertain," "review required," or "ambiguous defect profile," which may be used to exclude the item from automated routing decisions until further action is taken. This intermediate label may be temporarily stored in a system database along- side corresponding metadata such as image samples, pro- cessing timestamps, sensor calibration data, and relevant thresholds, thereby facilitating traceability and quality assur- ance auditing. In some implementations, a subset of these ambiguous or exception-classified items may be used to augment the machine vision training dataset, allowing future models to more confidently handle edge cases. Furthermore, exception frequency rates may be monitored and used to trigger adaptive system tuning, such as adjusting ambiguity thresholds 164, updating model weights, or altering camera parameters in response to recurring uncertainty under spe- cific conditions (e.g., batch-specific produce size, seasonal lighting variation, or unusual surface texture).

In further reference to FIG. 1, in some embodiments, when exception processing is initiated, particularly in cases of repeated ambiguity, system 100 may generate a real-time alert to notify relevant stakeholders or system operators of the elevated uncertainty. For purposes of this disclosure, a real-time alert may include a visual, auditory, or digital signal, such as an interface notification, system log entry, or API-triggered webhook, generated in response to detection of conditions exceeding predefined ambiguity or error thresholds. Alerts may be configured with variable urgency levels and may provide contextual metadata such as the produce type, suspected defect type 158, failed classification confidence level, and imaging conditions at the time of classification. In some embodiments, these alerts may be presented using a dashboard visualization interface, which aggregates live system diagnostics, item-level decision out- comes, exception rates, and historical error trends into a structured, operator-readable format. The dashboard may include real-time indicators (e.g., color-coded defect fre- quency graphs, ambiguity counters, throughput metrics) and may allow for filtering by defect type 158, batch identifier, time of day, or classification confidence.

With further reference to FIG. 1, in certain implementa- tions, system 100 may include a feedback integration mechanism configured to incorporate exception outcomes into predictive maintenance schedules and model retraining workflows. For example, if repeated ambiguity is traced to a specific imaging module (e.g., due to dust on a lens or degraded sensor performance), the system may flag the hardware for inspection and initiate a maintenance task. Likewise, if a spike in exception rates is detected for a particular defect type 158 under specific environmental conditions, system 100 may queue affected image samples and associated metadata into a retraining dataset. This feedback loop enables the continuous refinement of machine vision models 134 and system parameters, thereby improv- ing performance over time and reducing future ambiguity rates. In some embodiments, system 100 may autonomously update parameters such as lighting intensity, camera angle, or threshold values in response to cumulative exception statistics, enabling adaptive behavior without human inter- vention. In this way, exception processing not only safe- guards against classification uncertainty but also contributes to the overall resilience, reliability, and intelligence of the produce grading system.

In further reference to FIG. 1, in an embodiment, at least a processor 108 may be configured to estimate a hydration 140 of the produce item 130. For purposes of this disclosure, "hydration" is the relative water content of a produce item 130. Hydration 140 may correlate with a produce item's 130 freshness, firmness, juiciness, and market readiness. Further, hydration 140 can degrade over time due to factors such as evaporation, metabolic respiration, or environmental exposure, and can be a key quality indicator, especially for high-moisture crops such as tomatoes, grapes, peppers, and leafy greens. In an embodiment, estimating the hydration 140 of the produce item 130 may include receiving the at least an object-level visual feature 132 from the image data 126. Relevant object-level visual features 132, without limitation, may include color saturation, surface glossiness, wrinkle frequency, surface reflectance, or translucency. For example, high hydration may be associated with more saturated coloration (e.g., vivid red for ripe tomatoes), smoother skin (fewer curvature discontinuities), and a glossier surface that reflects overhead lighting. Conversely, dehydration may lead to surface dulling, wrinkling, desaturation, and a loss of turgor that is detectable in shape deformation or shadow artifacts.

In further reference to FIG. 1, estimating the hydration 140 of the produce item 130 may include applying a regression model 142 to the at least an object-level visual feature 132. A "regression model," for purposes of this disclosure, is a model configured to map one or more input features to a continuous numerical output. In some embodiments, the regression model 142 may include linear regression, polynomial regression, support vector regression (SVR), decision tree regression, or neural networks (e.g., a fully connected multilayer perceptron or a lightweight convolutional model adapted for regression). The input features may be raw pixel-level descriptors (e.g., RGB histograms), derived metrics (e.g., wrinkle index or spectral entropy), and/or embeddings produced by a preceding feature extractor. In some embodiments, regression model may include a machine-learning model. In an embodiment, to ensure accuracy and generalizability, the regression model 142 may be trained using a labeled dataset including pairs of image data 126 and ground-truth hydration values. These ground-truth values may be obtained through destructive testing (e.g., gravimetric analysis comparing fresh and dry weights), nondestructive sensors (e.g., near-infrared spectroscopy), and/or correlated with time-since-harvest under controlled conditions. Training may employ loss functions such as mean squared error (MSE) or mean absolute error (MAE), and may include data augmentation to simulate varying lighting, orientation, and produce conditions.

In an embodiment, estimating the hydration 140 of the produce item 130 may further include generating a hydration score 144 for the produce item 130 as a function of an output of the regression model 142. The hydration score 144 may be normalized between 0 and 1, where 1 represents optimal water content (e.g., freshly harvested), and 0 corresponds to severe dehydration or spoilage. In some cases, the hydration score 144 may be bucketed into categorical tiers (e.g., "fresh," "moderately dry," "dehydrated") for downstream classification and decision-making. These scores may be used to inform sorting actions, shelf-life predictions, or flagging items for rehydration treatment, repackaging, or removal from distribution. In some embodiments, the hydration 140 estimation model may be dynamically updated over time using reinforcement learning or active learning frameworks, incorporating feedback from downstream modules (e.g., customer complaints, spoilage rates, or manual inspection overrides) to refine prediction accuracy across varying produce types and environmental conditions.

In continued reference to FIG. 1, in further embodiments, the normalized object-level feature vectors and associated confidence scores may be passed to a control logic module that governs task execution by system components such as actuated arm 120, handling mechanisms 184, and routing infrastructure. Each feature vector may be interpreted as an input to a decision policy, which maps the extracted object attributes (e.g., size, shape, defect severity, stem location) to a set of predefined actions (e.g., grasp, trim, rotate, discard, reroute). The control logic module may include rule-based decision trees, thresholding logic, or a trained policy network (e.g., using reinforcement learning) to select and prioritize actions for each produce item 130. In an embodiment, high-confidence classifications (e.g., a clear defect with a well-localized boundary) may trigger immediate actuation, whereas low-confidence outputs may delay processing or trigger additional inspection using reimaging or multi-view fusion. Trajectory planning for actuated arm 120 may be dynamically adjusted based on real-time object features and pose information. For example, an item identified as having a stem protruding at a specific angle may result in a planned end-effector path that minimizes collision with adjacent items while aligning precisely with the stem's location for removal. Similarly, the estimated defect location may be used to define a cutting or gripping boundary, which is then translated into spatial coordinates within the workspace of the at least an actuated arm 120. These coordinates may be transformed using affine or forward kinematics to derive motor commands compatible with the physical configuration of the robotic frame 118.

In certain implementations, the control logic may also apply routing thresholds, wherein each produce item 130 is assigned a routing class, such as "ready for packaging," "requires trimming," or "divert for discard," based on composite feature vector scores. These scores may combine quantitative measurements (e.g., surface area, defect percentage) with qualitative assessments (e.g., shape symmetry or color uniformity). Items falling near decision boundaries may be flagged for secondary review, human-in-the-loop confirmation, or post-sort classification. All control decisions may be timestamped, recorded, and associated with image data 126 and feature vectors to enable traceability, performance auditing, and adaptive retraining of the machine vision models 134.

With continued reference to FIG. 1, in an embodiment, at least a processor 108 may be configured to control the at least an actuated arm 120 to perform a handling operation 138 on the produce item 130 as a function of the defect classification label 136. As used herein, a "handling operation" refers to any mechanical or electromechanical action executed by the at least an actuated arm 120 for the purpose of altering the position, orientation, condition, or processing path of a produce item 130. Without limitation the handling operation 138 may be directly determined by the assigned defect classification label 136, which encodes the nature and severity of a defect, and may dictate one or more corresponding operational responses. In some embodiments, the handling operation 138 may include reorienting the produce item 130 for secondary imaging, trimming, or presentation; removing a defective region using a cutting or abrasion tool; or routing the produce item 130 to a specific downstream station such as a disposal bin, salvage line, or packaging area. For example, a tomato with a minor surface blemish classified as "cosmetic defect-salvageable" may be repositioned using a compliant hook to expose the defect region, followed by deployment of a removal tool 182 to excise the affected area. Conversely, an item classified as "irreparable"

based on mold detection may be grasped and redirected to a reject bin using a gripping arm. In implementations, at least a processor 108 may reference a handling response table or control logic that maps classification labels to pre-defined arm trajectories, grip strengths, engagement tools, or actuator speeds.

In further reference to FIG. 1, in an embodiment, at least a processor 108 may be configured to determine a position of a stem 168 of the produce item 130 as a function of the defect classification label 136. For purposes of this disclosure, the "position of the stem" refers to a spatially resolved estimate of where the stem is located and how it is oriented within a three-dimensional coordinate system. In some cases, identifying the stem's location may be triggered conditionally, for example, when a defect classification label 136 indicates stem detachment risk, abnormal growth pattern, or a defect localized near the top portion of the produce item 130. In such cases, stem localization may support targeted trimming, reorientation, or grading decisions. In an embodiment, determining the position of the stem of the produce item 130 may include generating, as a function of the defect classification label 136, a three-dimensional spatial representation of the produce item 170 as a function of the image data 126. This may include using stereoscopic image data or other structured light-based depth acquisition methods. This spatial representation may take the form of a point cloud, depth map, or mesh structure that encodes the external geometry of the produce item 130. Features such as curvature, surface normal vectors, and localized elevation changes may be computed across the three-dimensional surface to aid in identifying candidate stem regions.

Further, determining the position of the stem of the produce item 130 may include analyzing the three-dimensional spatial representation using a stem identification algorithm 172 configured to detect a geometric feature corresponding to the stem. Such algorithms may employ pattern recognition models trained on annotated datasets of produce images and associated stem geometries, where each training sample is labeled with spatial annotations corresponding to the location and shape of the stem. These models may be based on deep convolutional neural networks (CNNs), graph-based shape models, or hybrid rule-based systems incorporating domain-specific heuristics. The algorithm may segment the point cloud, voxel grid, or mesh representation of the produce item 130 into candidate regions based on curvature, surface normal analysis, or texture gradients. In some cases, the stem identification algorithm 172 may prioritize features such as tapering morphology (e.g., a gradual narrowing in diameter from the calyx to the distal end), branching points (e.g., bifurcation where a stem meets multiple subunits or the main body), or location continuity with known anatomical attachment zones (e.g., the top central region of a tomato or the node where clusters join a vine). In certain implementations, the algorithm may employ a scoring function to rank potential stem candidates based on a combination of geometric consistency, topological alignment, and visual cues such as color contrast or vein patterning. The scoring function may also incorporate prior probability distributions that encode expected stem positions for different types of produce, allowing the system to adjust its search parameters dynamically based on produce classification results. For example, in detecting a tomato stem, the algorithm may assign higher likelihood to elevated regions with a radial surface depression and green pigmentation. In contrast, for grapes, the algorithm may focus on identifying linear connectors between round subunits exhibiting symmetric spacing. Once the candidate region with the highest score is identified, the system may refine the result using a local fitting model, such as a cylinder or spline surface, to estimate the stem's axis and terminal point, which are then passed downstream for use in robotic motion planning and tool alignment.

In an embodiment, determining the position of the stem of the produce item 130 may further include determining a three-dimensional pose of the stem 174, the pose including both a location and orientation of the stem in space. The "location" may refer to the stem's spatial coordinates (e.g., x, y, z) in a global or local reference frame, while the "orientation" may describe the angular alignment of the stem's principal axis, expressed in terms of rotation angles (e.g., roll, pitch, yaw) or quaternion-based representations. The process of pose estimation may involve fitting a geometric primitive (e.g., a vector, line segment, or cylindrical model) to the detected stem region in the point cloud or volumetric mesh, followed by extraction of directional vectors aligned with the stem's longitudinal axis. In some implementations, machine vision models 134 may be employed to estimate the pose directly from image features, while in others, a two-stage pipeline may be used in which geometric fitting is refined by model-based validation. This may allow downstream modules to reason about how the stem is positioned and aligned, which is essential for precise engagement using a robotic end-effector. For instance, a robotic manipulator may require pose information to compute a collision-free trajectory that positions the removal tool 182 at an optimal angle for cutting or gripping. The orientation of the stem may inform the selection of an approach vector 178 (e.g., top-down, lateral, oblique) that maximizes tool access while minimizing the risk of slippage or accidental damage to adjacent regions of the produce item 130. In cases where the stem is angled, twisted, or partially embedded in a cluster (e.g., tomatoes on a vine or grapes on a branch), accurate pose estimation may become even more critical to ensure that trimming or repositioning operations are performed cleanly and safely. Furthermore, the pose data may be used to synchronize the timing and directionality of multi-actuator operations, such as when a gripping arm must stabilize the item while a separate trimming arm performs the cut. By integrating pose estimation into the control logic, system 100 enhances its ability to perform fine-motor manipulations across a wide range of produce geometries and orientations.

In relation to the above, controlling the at least an actuated arm 120 to perform a handling operation 138 on the produce item 130 may include generating a motion plan 176 to position the at least an actuated arm 120 relative to the determined three-dimensional pose of the stem 174 as a function of the location of the stem in space. For purposes of this disclosure, a "motion plan" is a sequence of one or more time-ordered positional, velocity, and orientation instructions that define the desired path of the at least an actuated arm 120 and its end-effector through space. In some embodiments, the motion plan 176 may be generated using kinematic and dynamic models of the robotic system, including inverse kinematics solvers, trajectory optimization algorithms, and constraint-based planning routines. These models may take into account the number of degrees of freedom of the robotic arm, joint limits, acceleration and deceleration curves, and mechanical tolerances of the actuators. In an embodiment, the motion plan 176 may begin with a target position, defined by the three-dimensional pose of the stem 174, and compute a collision-free path from the current position of the robotic arm to the desired endpoint. Path planning may be performed using algorithms such as Rapidly-exploring Random Trees (RRT), A\*, or CHOMP, depending on the complexity of the environment and the need for real-time responsiveness. In some embodiments, the path may be further smoothed or optimized for minimal energy consumption, reduced execution time, or minimal disturbance to surrounding produce items 130. In scenarios where multiple stems or subunits are being manipulated in sequence (e.g., in the case of clustered tomatoes or grapes), the motion plan 176 may also incorporate intermediate waypoints, retreat paths, or recovery poses to ensure stable transitions between operations. In an embodiment, at least a processor 108 may also simulate or validate the planned path using a virtual model of the work envelope, checking for clearances with respect to camera housings, conveyor hardware, other produce items 130, or known zones of restricted motion. By tightly coupling the output of the stem pose estimation module with the motion planning logic, system 100 may be able to execute fast, repeatable, and precise engagement routines tailored to each produce item's 130 unique geometry and spatial orientation.

Further, in some cases, controlling the at least an actuated arm 120 to perform a handling operation 138 on the produce item 130 may include determining an approach vector 178 and tool orientation 180 as a function of the orientation of the stem in space. For purposes of this disclosure, an "approach vector" is a directional vector defining the path along which the robotic end-effector should move to engage the stem. In an embodiment, an approach vector may be expressed in relation to a global coordinate system (e.g., x, y, z) or local frame of reference relative to the produce item 130. A "tool orientation," for purposes of this disclosure, is the rotational alignment of the end-effector at the moment of engagement. As a non-limiting example, the tool orientation 180 may be specified using Euler angles, quaternions, or directional cosines. In an embodiment, determining the approach vector 178 may involve evaluating the stem's axial direction and identifying the safest and most effective route of entry based on tool type, stem accessibility, and spatial constraints. For example, a vertically oriented stem on a tomato may call for a top-down approach, while a diagonally positioned grape cluster stem may require an oblique or side-entry path to avoid entanglement. This vector determination may also take into account environmental obstacles, adjacent subunits, or conveyor movement, particularly in high-speed processing systems. At least a processor 108 may simulate multiple approach paths and score them based on criteria such as reachability, stability, or minimal angular deviation from the tool's optimal cutting axis. Tool orientation 180 may be equally critical to ensure that the applied force is properly aligned with the stem geometry. Misalignment can lead to incomplete cuts, slippage, or damage to the surrounding produce. The orientation may be actively adjusted in real time using closed-loop feedback from force sensors, vision systems, or encoder data. In some cases, tool orientation 180 may also be adapted dynamically in response to real-time updates in pose estimation, especially in scenarios involving partially occluded stems or produce items 130 that shift during conveyance.

Continuing, controlling the at least an actuated arm 120 to perform a handling operation 138 on the produce item 130 may further include actuating a removal tool 182 operatively coupled to the at least an actuated arm 120 to engage the produce item 130 for trimming. For purposes of this disclosure, "actuating" refers to initiating the mechanical movement or activation of the tool through an electronic or pneumatic control signal issued by the processor or control system. This step may occur once the robotic arm has been moved into the desired position and orientation relative to the stem, as determined by the prior generation of a motion plan 176 and approach vector 178. The removal tool 182, which may include, without limitation a single-blade chisel, serrated cutter, rotating blade, clamp, or shearing mechanism, may be precisely activated based on the spatial parameters of the stem and the intended trim operation. In some embodiments, trimming may involve partial removal (e.g., shortening an excessively long stem) or complete detachment (e.g., severing a tomato from a vine or removing damaged tissue). The actuation command may be issued with timing precision to account for motion dynamics of the produce item 130 (e.g., if on a conveyor belt), and may be further modulated based on sensor input, such as force feedback or tool pressure readings, to ensure that the cut is clean without applying excessive force that could damage the produce item 130. Additionally, actuation logic may vary depending on the tool type, such as linear actuation for a blade, rotational actuation for a disc cutter, or gripping pressure modulation for a clamp. In certain cases, trimming may be followed by a verification step using post-action image capture to confirm successful removal. The combination of precise pose alignment, approach vector 178 optimization, and controlled actuation enables system 100 to execute reliable, repeatable trimming operations across a variety of produce types, stem morphologies, and cluster configurations.

With continued reference to FIG. 1, in an embodiment, the handling operation 138 may be carried out using open-loop or closed-loop control strategies. In closed-loop implementations, real-time feedback from force sensors, encoders, or visual tracking modules may be used to adjust the arm's movement dynamically in response to unexpected resistance, slippage, or alignment error. Additionally, at least a processor 108 may consider contextual information, such as produce orientation, item fragility, or spatial constraints, when determining the handling trajectory. In some cases, multiple actuated arms may be coordinated to execute compound handling operations 138, such as simultaneous stabilization and trimming, or synchronized pick-and-place tasks. The result is a responsive, intelligent manipulation framework that optimizes produce handling outcomes based on individualized quality assessments encoded by the defect classification label 136.

In continued reference to FIG. 1, in an embodiment, handling operations 138 may be further stratified based on severity tiers embedded within the defect classification label 136. For example, classification labels may include tags such as "Grade A-no defect," "Grade B-cosmetic only," "Grade C-salvageable with intervention," or "Reject-severe defect." Each severity tier may trigger a different level of robotic intervention. For instance, Grade A items may be routed directly to packaging with minimal handling, whereas Grade C items may undergo coordinated multi-arm manipulation for trimming and reshaping. In contrast, items labeled as "Reject" may bypass all intermediate steps and be directly transferred to a waste chute or inspection queue for human verification. In certain configurations, at least a processor 108 may adjust grip pressure, tool selection, or movement velocity based on the severity tier to minimize damage during handling of marginally acceptable produce.

Additionally, system 100 may support batch-processing logic whereby handling operations 138 may be optimized across a sequence or group of produce items 130 sharing common classification characteristics. For example, if multiple tomatoes are classified with "minor bruising," system 100 may queue them for grouped trimming operations using a shared toolpath. This approach reduces arm travel time and increases throughput. In some cases, batch-level handling rules may override item-specific instructions to preserve workflow efficiency or to conform to real-time system constraints (e.g., tool availability, processor load, or station occupancy). For traceability, system 100 may log each item's defect classification, handling operation 138, and destination, enabling downstream analytics, regulatory compliance, or quality assurance processes. This integrated decision-making framework may ensure that both individual and collective defect assessments inform dynamic, high-precision handling actions within the automated grading system.

With continued reference to FIG. 1, in further embodiments, system 100 may implement multi-stage or conditional handling sequences in which the handling operation 138 executed by the at least an actuated arm 120 is dependent on the successful completion of a preceding task or on the real-time outcome of an intermediate inspection. For example, after an initial classification indicating a "salvageable defect" tier, system 100 may command the removal tool 182 to excise the identified defect region. Upon completion, system 100 may then trigger a secondary imaging process to re-assess the trimmed produce item 130. If the residual features fall below a defect-specific threshold 160, the produce item 130 may be upgraded and routed to a packaging station. If not, it may be downgraded and sent for manual review or discarded. This conditional logic may enable adaptive workflows that evolve in response to updated visual input or intermediate classification results. In some configurations, multiple conditional branches may be stored in a task tree or decision graph structure, allowing system 100 to flexibly navigate multi-path workflows based on probabilistic confidence scores, remaining item integrity, or quality constraints set by an operator or regulatory guideline. To support such flexibility, system 100 may include tool change automation logic whereby at least a processor 108 identifies the appropriate end-effector required for a specific defect class and commands a tool-switching mechanism to engage or disengage tools dynamically. For instance, a produce item 130 identified with surface mold may require a soft brush or scraping attachment, while one with stem overgrowth may necessitate deployment of a single-blade chisel tool, such as a fixed-angle industrial knife similar to those used in hydraulic hose cutting systems. System 100 may include a tool docking station mounted to the robotic frame 118 or nearby housing, enabling automated pickup, calibration, and return of interchangeable tools based on handling requirements. In an embodiment, at least a processor 108 may also verify tool type and readiness using tool identification codes (e.g., RFID tags or optical markers) and may recalibrate kinematic paths based on the geometry and force profile of the newly engaged tool. In some embodiments, tool-change decisions may also consider tool wear data, maintenance schedules, or the recent frequency of use, thereby promoting both operational efficiency and safety. This modular tool-switching capability may enable highly targeted, produce-specific interventions that maintain quality standards while minimizing unnecessary downtime.

Still referring to FIG. 1, in an embodiment, system 100 may include one or more exception-handling routines configured to detect and respond to abnormal conditions arising during handling operations 138, such as tool failure, incomplete engagement, or unexpected deformation of a produce item 130. For example, if a cutting tool fails to sever a stem cleanly, at least a processor 108 may detect a mismatch between expected and actual sensor readings (e.g., position encoders, force sensors, or post-action image data), triggering a fault-handling subroutine. In some implementations, the at least an actuated arm 120 may retract and attempt a secondary cut from an alternate angle or engage a fallback tool, such as a precision blade or higher-force actuator. In cases where a produce item 130 deforms under gripping force or shifts position during handling, system 100 may perform a rapid re-localization using real-time vision feedback, followed by a path replan or grip adjustment. When repeated exceptions occur, such as tool slippage, produce rolling, or multi-axis instability, system 100 may escalate to a safety state that isolates the produce item 130, logs the event, and routes the produce item 130 to a designated exception bin for human inspection. In an embodiment, exception-handling routines may also integrate with predictive maintenance and tool wear detection systems. For instance, if the same failure type recurs across multiple items (e.g., incomplete cuts or excessive grip pressure), at least a processor 108 may infer degradation of the associated tool or actuator and flag it for servicing. In some configurations, system 100 may log exception context data, such as produce item 130 classification, image data 126, and handling force profile, into a failure database for later analysis and model retraining. This closed-loop learning approach enables the system to improve over time, reducing the frequency of handling errors and enhancing both safety and operational efficiency.

In continued reference to FIG. 1, in some embodiments, system 100 may be configured to dynamically adjust its handling strategy based on the confidence score associated with the defect classification label 136 or handling plan. For instance, when the confidence score of a visual classification or pose estimate falls below a predetermined threshold, system 100 may trigger a fallback behavior, such as reverting to a more conservative grasp profile, switching to a non-destructive inspection routine, or invoking a secondary classification model. This approach reduces the risk of applying an aggressive action (e.g., cutting or forceful gripping) to produce items 130 with ambiguous or borderline classifications. In some configurations, low-confidence handling actions may also be deferred entirely, queuing the item for re-inspection or operator review. System 100 may maintain a configurable policy matrix linking ranges of confidence levels to corresponding fallback routines, tool restrictions, or reprocessing protocols. When fallback mechanisms are exhausted or a predefined number of consecutive exceptions are logged (e.g., repeated slippage, trimming failure, or unresolved classification ambiguity), system 100 may escalate to an operator alert state. In such a case, at least a processor 108 may generate a real-time notification using the system's user interface, display console, or external alerting system (e.g., email, SMS, or dashboard integration). The alert may include context such as the produce type, defect class, captured image(s), exception type, and timestamp, and may prompt the operator to manually intervene, confirm override actions, or perform maintenance procedures. In high-throughput deployments, these alerts may also be aggregated into exception summaries or trend reports, allowing operators or administrators to identify recurring fault conditions or retraining needs. This integrated alerting and fallback logic ensures system reliability and provides traceable insight into quality assurance breakdowns or evolving production edge cases.

Figure 2A:
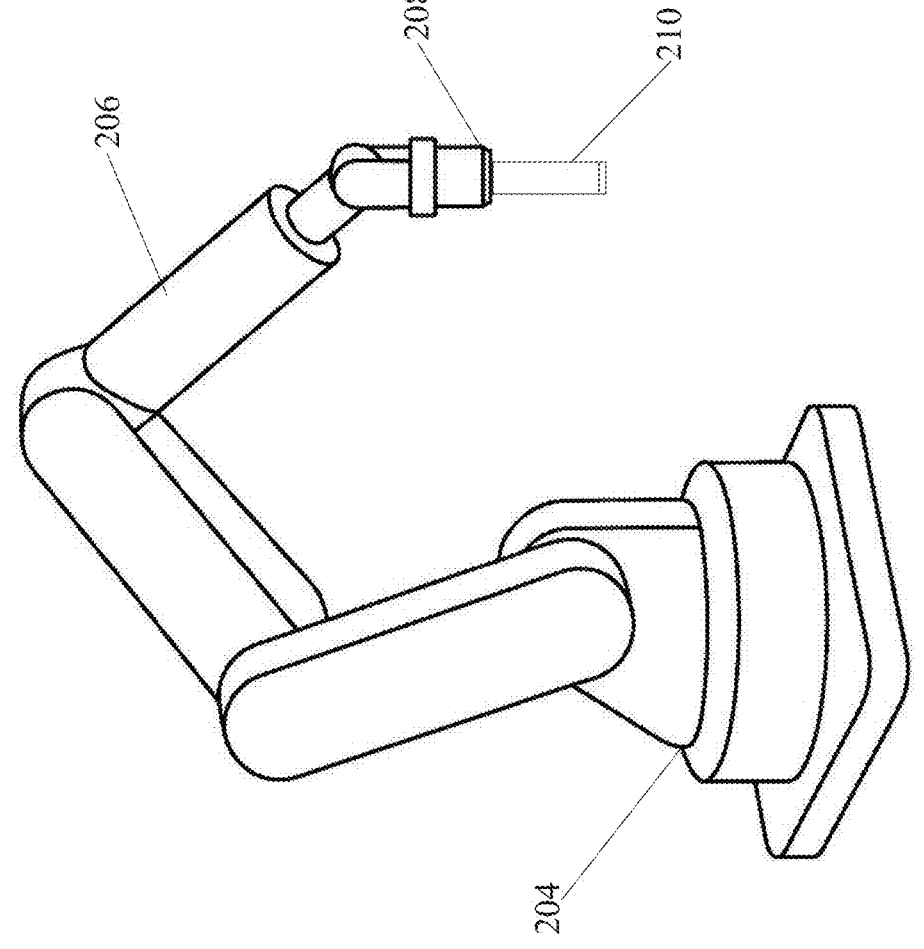
FIG. 2A illustrates an exemplary system including single actuated arm operatively coupled to a removal tool.

Now referring to FIG. 2A, an exemplary system 200*a* including a single actuated arm operatively coupled to a removal tool is illustrated. As shown, system 200*a* may include a robotic frame 204, which provides the foundational structure to which various robotic and control components may be mounted. The robotic frame 204 may include mechanical supports, brackets, and housings that secure moving parts in a fixed or semi-fixed position relative to the operational environment. The robotic frame 204 supports an actuated arm 206, which may include a multi-jointed robotic appendage operable in one or more degrees of freedom. The actuated arm 206 may include motors, linkages, and joint assemblies to permit articulated movement under control of a computing device. In various embodiments, the actuated arm 206 may execute motion plans based on visual and spatial data derived from the machine-vision system described elsewhere in this disclosure.

In continued reference to FIG. 2A, an end effector 208 may be operatively coupled to a distal portion of the actuated arm 206. As used herein, the end effector 208 refers to the component responsible for interacting physically with the produce item or a portion thereof. End effectors may vary in design depending on the handling or manipulation task and may include gripping tools, suction devices, cutters, or sensors. In the illustrated embodiment, the end effector 208 includes a removal tool 210, configured to selectively engage and excise, detach, or otherwise remove a portion of the produce item. The removal tool 210 may be implemented as a chisel-shaped cutter, a knife edge, or a high-precision blade, and may be controlled to actuate only upon satisfaction of pre-defined defect classification criteria. The mechanical design of the removal tool 210 may enable effective interaction with stem structures, damaged surface regions, or subunit clusters, as identified by upstream imaging and processing systems.

Now referring to FIG. 2B, an exemplary system 200b including a dual-arm configuration in which robotic frame 204 supports a pair of actuated arms 206, each coupled to a distinct end effector 208. In this embodiment, robotic frame 204 provides a shared mounting platform for a first actuated arm 212 and a second actuated arm 214, allowing coordinated manipulation and trimming of a produce item. The first actuated arm 212 may be configured similarly to actuated arm 206 in FIG. 2A and is operatively coupled to an end effector 208, which in turn supports a removal tool 210. As previously disclosed, removal tool 210 may be a chisel-like cutting instrument designed to sever stems, trim damaged areas, or segment produce into subunits with minimal disruption.

With continued reference to FIG. 2B, the second actuated arm 214 is operatively coupled to a distinct handling mechanism 216, using another end effector 208 (or a variation thereof, depending on system implementation). The handling mechanism 216 may be used to grasp, reorient, or stabilize produce items during inspection or processing. In some embodiments, handling mechanism 216 may include soft-touch grippers, suction modules, or tensioned guides designed for non-destructive control. Additionally, the handling mechanism 216 may include a hook system 218, which is one specific configuration suitable for engaging produce items with a central stem, loop, or suspended architecture. The hook system 218 may be passively suspended or actively actuated and may feature curvature, spring tension, or compliance optimized for gentle but secure engagement. The cooperative function of both actuated arms enables synchronized trimming and handling operations based on item-specific classification and pose estimation results.

Figures 3A, 3B, 3D, 3E, 3F:
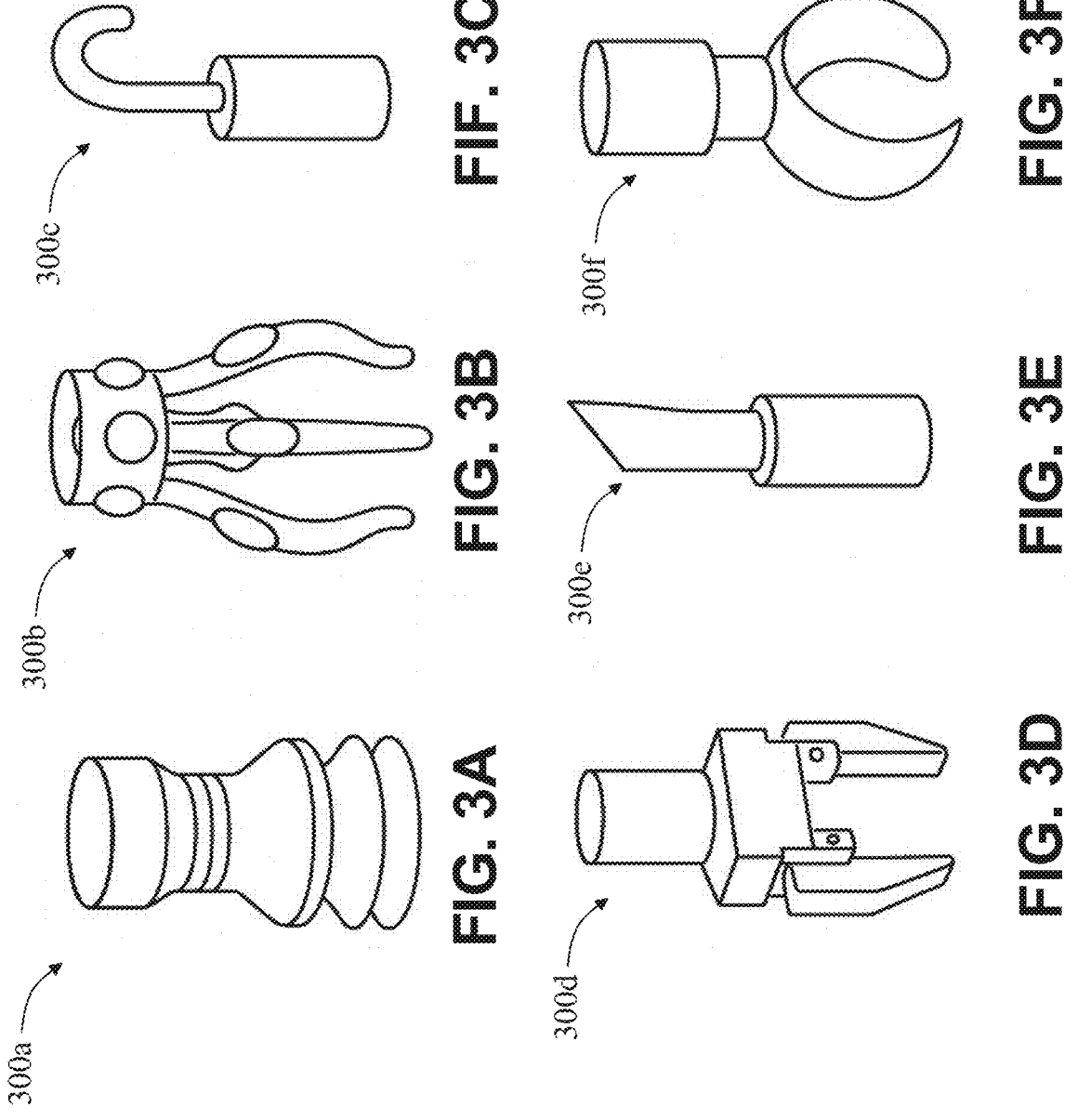

Referring now to FIG. 3A, an exemplary suction-based end effector 300a is shown. The end effector 300a may include a deformable suction cup mounted to a flexible or gimbaled joint. A vacuum source may be in fluid communication with the suction cup, enabling temporary adhesion to the surface of a produce item. In some embodiments, one or more pressure sensors may monitor vacuum integrity to ensure a secure grip, and a pressure relief valve may be employed to prevent over-adhesion. This configuration may be used to manipulate smooth-skinned produce items such as apples, citrus fruits, or tomatoes.

Referring now to FIG. 3B, an exemplary soft robotic gripper 300b is depicted. The gripper 300b may include a plurality of compliant fingers fabricated from flexible materials such as silicone, thermoplastic elastomers, or other deformable polymers. The fingers may be passively or actively actuated to conform around the contours of a produce item, distributing contact pressure evenly. This configuration is particularly suited to handling soft or delicate produce such as vine-ripened tomatoes, peaches, or plums, where rigid gripping mechanisms may pose a damage risk.

Referring now to FIG. 3C, an exemplary hook-based handling mechanism 300c is illustrated. The mechanism 300c may include a curved hook element mounted to a rigid or semi-rigid support structure. In some embodiments, the hook may be fixed in place, while in others, it may articulate using a passive hinge or active actuator. The hook may be configured to engage a structurally stable portion of the produce item, such as the stem, calyx, or cluster junction, allowing for selective lifting, rotation, or transfer of the item as a function of its defect classification or processing stage.

Referring now to FIG. 3D, a two-finger mechanical gripper 300d is shown. The gripper 300d may include a pair of opposing arms, each terminating in a textured or rubberized contact pad. The arms may be actuated pneumatically, hydraulically, or electrically and may be configured to close symmetrically about a produce item. In some cases, force or pressure sensors may be embedded within one or both gripping surfaces to regulate applied force, thereby minimizing the risk of bruising or compression damage during stabilization or repositioning.

Referring now to FIG. 3E an exemplary chisel-style removal tool 300e is illustrated. The removal tool 300e may include a rigid housing supporting a flat, angled blade configured to execute precise trimming operations. In some embodiments, the blade may be beveled on one side to facilitate controlled entry into fibrous tissue, such as the stem of a tomato or pepper. The removal tool 300e may be operatively coupled to an actuated arm and oriented according to a computed approach vector to perform detachment, defect excision, or segmentation tasks with minimal disruption to adjacent regions of the produce item.

Referring now to FIG. 3F, an exemplary claw-style gripper 300f is shown. The illustrated end effector comprises a multi-pronged, curved gripping mechanism configured to mechanically engage and lift a produce item. Unlike suction-based tools, this gripper may utilize rigid or semi-rigid fingers arranged to close around the item, providing secure contact through friction and enclosure. The claw configuration may be actuated by mechanical, pneumatic, or servo-driven means and may be particularly suited for produce with irregular geometry or external structures (e.g., stems, caps, or calyxes) that facilitate secure engagement. In some embodiments, the claw gripper may include spring-loaded joints or compliant inserts to allow for conformance with delicate or variable shapes while minimizing pressure-induced damage.

Figure 4:
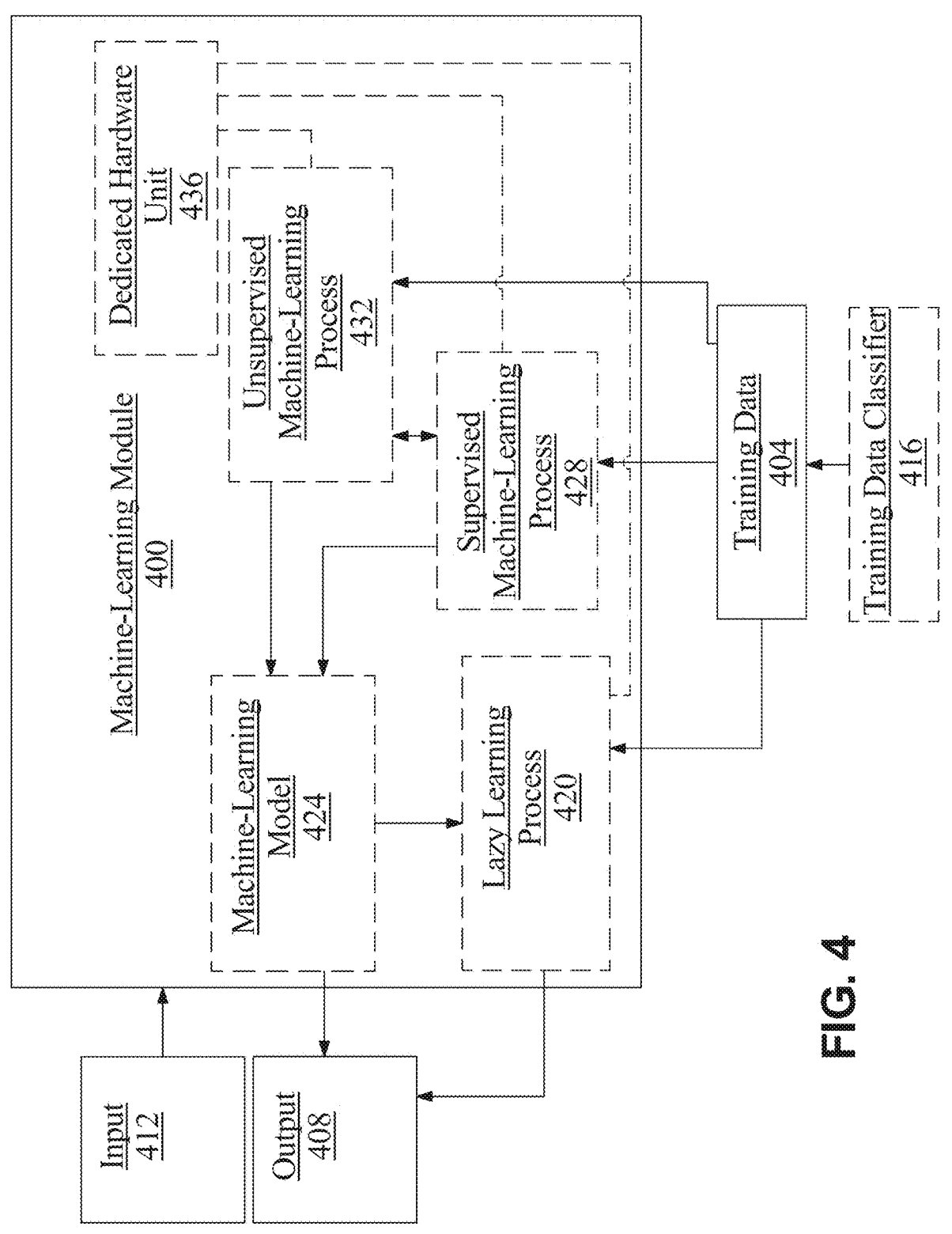
FIG. 4 illustrates a block diagram of an exemplary embodiment of a machine-learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure As a non-limiting illustrative example, input data may include image data of a produce item acquired from one or more cameras, where the image data includes visual features such as size, shape, texture, color gradients, and stem position. Output data may include one or more labels corresponding to defect classification, hydration score, subunit count, or grading tier, each of which may be used by downstream modules to inform handling operations, trimming decisions, or final packaging selection. Such training data may further enable machine-learning module 400 to adaptively improve classification accuracy across a diverse set of produce types, lighting conditions, and defect manifestations by learning generalized feature mappings and context-specific adjustments.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to reflect sub-populations of produce items based on shared morphological characteristics (e.g., oblong-shaped tomatoes, clustered grapes, or thick-stemmed peppers), allowing specialized models to be trained and applied to different structural variants or phenotypic classes. This supports tailored processing logic for subtypes with unique defect profiles, hydration sensitivities, or subunit patterns.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P (A/B)=P (B/A) P (A)=P (B), where P (A/B) is the probability of hypothesis A given data B also known as posterior probability; P (B/A) is the probability of data B given that the hypothesis A was true; P (A) is the probability of hypothesis A being true regardless of data also known as prior probability of A; and P (B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of the disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 4, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 4, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
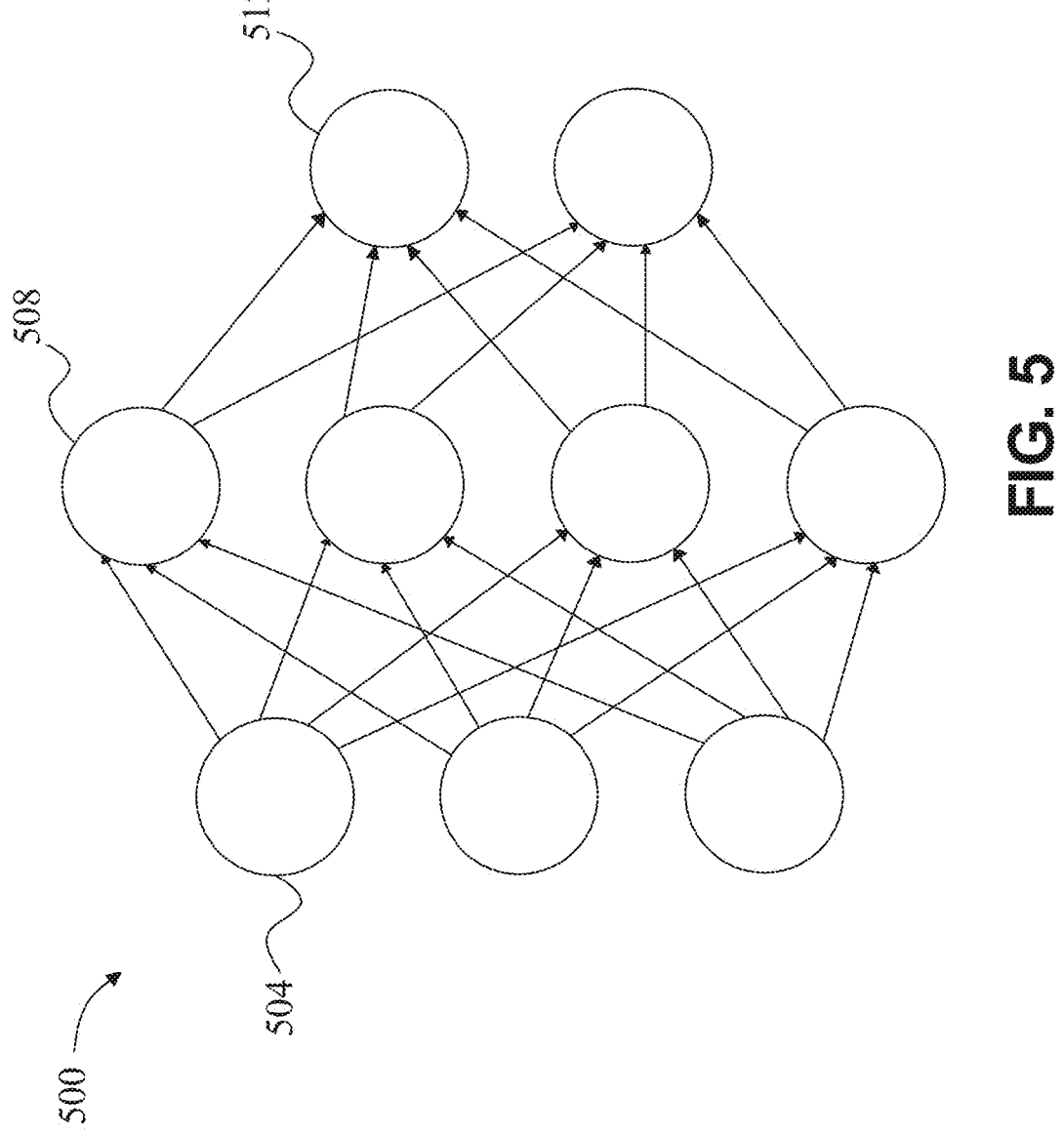
FIG. 5 illustrates a schematic diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
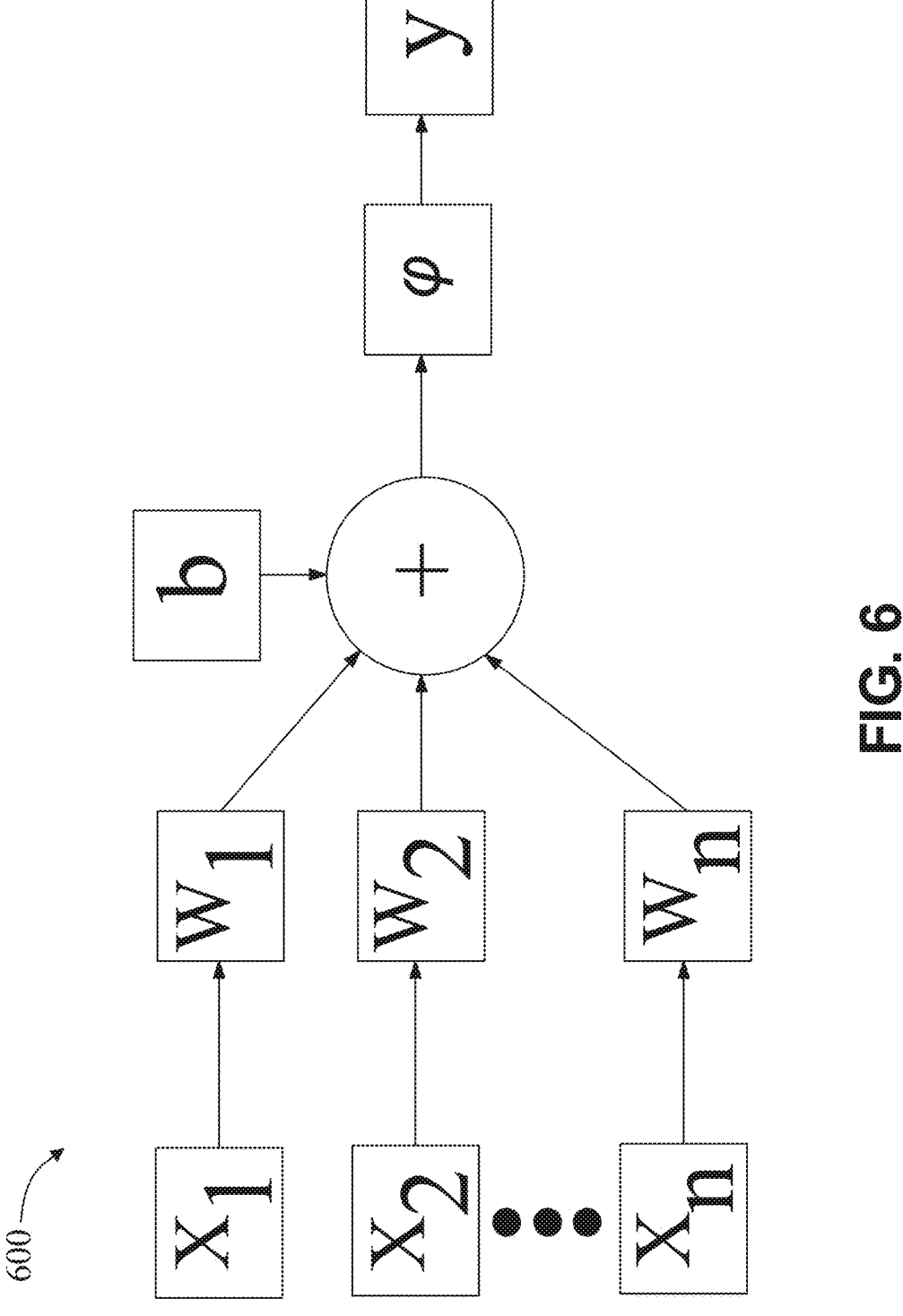
FIG. 6 illustrates a schematic diagram of an exemplary embodiment of a neural network node.

Referring now to FIG. 6, an exemplary embodiment of a node 600 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha \frac{dJ}{dw}$$

where $w_{new}$ is the updated weight value, $w_{old}$ is the previous weight value, a is a parameter to set the learning rate, and $$\frac{dJ}{dw}$$

is the partial derivative or with respect to weight w.

Referring now to FIG. 7, an exemplary method 700 for automated produce grading and sorting using machine vision and robotics is illustrated. Method 700 may include a step 705 of receiving, from a machine-vision system including at least a camera, image data including at least two captured viewpoints of a produce item. This may be implemented, without limitation, as referenced in FIGS. 1-6.

In continued reference to FIG. 7, method 700 may include a step 710 of extracting, using at least a processor, at least an object-level visual feature from the image data using a machine vision model. This may be implemented, without limitation, as referenced in FIGS. 1-6.

With further reference to FIG. 7, method 700 may include a step 715 of assigning, using the at least a processor, a defect classification label to the produce item as a function of the at least an object-level visual feature. In an embodiment, assigning a defect classification label to the produce item may further include: identifying a defect type as a function of the at least an object-level visual feature, comparing the at least an object-level visual feature to a defect-specific threshold, and outputting a defect classification label as a function of comparing the at least an object-level visual feature to a defect-specific threshold. In an embodiment, assigning the defect classification label may further include: generating a numerical value for the at least an object-level visual feature, comparing the numerical value of at least an object-level with an ambiguity threshold corresponding to a defect type, capturing, as a function of comparing the numerical value of the at least an object-level visual feature with the ambiguity threshold, secondary image data of the produce item, and re-evaluating the at least an object-level visual feature using the secondary image data to refine the defect classification label. This may be implemented, without limitation, as referenced in FIGS. 1-6.

In some aspects, method 700 may further include estimating a hydration of the produce item, wherein estimating a hydration of the produce item includes: receiving the at least an object-level visual feature from the image data, applying a regression model to the at least an object-level visual feature, and generating a hydration score for the produce item as a function of an output of the regression model.

In continued reference, in some aspects, method 700 may further include detecting a plurality of subunits of the produce item, wherein detecting the plurality of subunits of the produce item includes: applying an edge detection algorithm to the image data to identify boundary features within the produce item, determining, as a function of the boundary features, a connectivity determination including one or more of a quantity and configuration of the plurality of subunits. This may be implemented, without limitation, as referenced in FIGS. 1-6.

With continued reference to FIG. 7, method 700 may further determining a position of a stem of the produce item as a function of the defect classification label, wherein determining the position of the stem of the produce item includes: generating, as a function of the defect classification label, a three-dimensional spatial representation of the produce item as a function of the image data, analyzing the three-dimensional spatial representation using a stem identification algorithm configured to detect a geometric feature corresponding to the stem, and determining a three-dimensional pose of the stem, the pose including a location and orientation of the stem in space. This may be implemented, without limitation, as referenced in FIGS. 1-6.

Still referring to FIG. 7 method 700 may include a step 720 of controlling, using the at least a processor, at least an actuated arm of a robotic frame to perform a handling operation on the produce item as a function of the defect classification label. In an embodiment, controlling the at least an actuated arm to perform a handling operation on the produce item may include: generating a motion plan to position the at least an actuated arm relative to the determined three-dimensional pose of the stem as a function of the location of the stem in space, determining an approach vector and tool orientation as a function of the orientation of the stem in space, and actuating a removal tool operatively coupled to the at least an actuated arm to engage the produce item for trimming. In an embodiment, the at least an actuated arm may include a removal tool configured to engage a stem of the produce item. In an embodiment, the robotic framework may further include a handling mechanism including a hook system, wherein: the hook system is configured to selectively engage and reposition the produce item as a function of the defect classification and the handling mechanism is operatively coupled to the at least an actuated arm. IN an embodiment, the at least an actuated arm includes: a first actuated arm, wherein the first actuated arm is operatively coupled to a removal tool and a second actuated arm, wherein the second actuated arm is operatively coupled to a handling mechanism. This may be implemented, without limitation, as referenced in FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
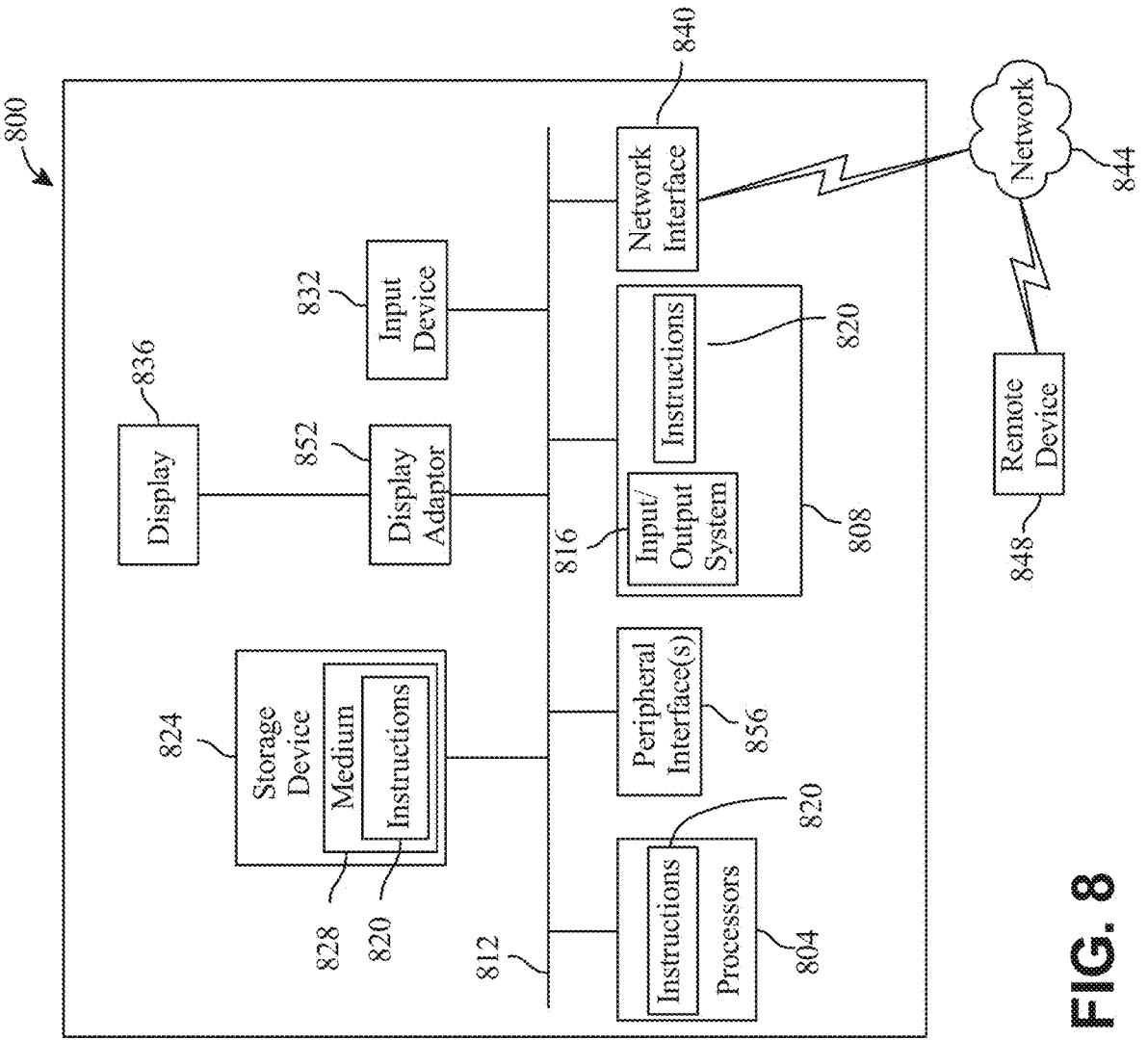
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof. Memory 808 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In some embodiments, storage device 824 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

Further referring to FIG. 8, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 8, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 8, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 800, processor 804, and memory 808 may be virtualized; that is, a virtual machine and/or container may interact directly with such computing system 800, processor 804, and/or memory 808, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 804 comprises a plurality of processors and/or processor cores, virtualization may, in some cases, simulate or emulate a single (virtual) processor whose functions are allocated to one or more of the plurality of processors and/or processor cores. In this case, while processor 804 may be said to be virtualized, the processor 804, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for automated produce grading and sorting using machine vision and robotics, the system comprising:
   a robotic frame comprising at least an actuated arm;
   a machine-vision system comprising at least a camera, the machine-vision system communicatively connected to a computing device; and
   the computing device comprising at least a processor and a memory communicatively connected to the at least a processor, the memory storing instructions configuring the at least a processor to:
      receive image data from the at least a camera, the image data comprising at least two captured viewpoints of a produce item;
      extract at least an object-level visual feature from the image data using a machine vision model;
      assign a defect classification label to the produce item as a function of the at least an object-level visual feature, wherein assigning the defect classification label to the produce item further comprises:
         identifying a defect type as a function of the at least an object-level visual feature;
         comparing the at least an object-level visual feature to a defect-specific threshold; and
         outputting the defect classification label as a function of comparing the at least an object-level visual feature to the defect-specific threshold; and
      control the at least an actuated arm to perform a handling operation on the produce item as a function of the defect classification label.

2. The system of claim 1, wherein the at least a processor is further configured to estimate a hydration of the produce item, wherein estimating the hydration of the produce item comprises:
   receiving the at least an object-level visual feature from the image data;
   applying a regression model to the at least an object-level visual feature; and
   generating a hydration score for the produce item as a function of an output of the regression model.

3. The system of claim 1, wherein the at least a processor is further configured to detect a plurality of subunits of the produce item, wherein detecting the plurality of subunits of the produce item comprises:
   applying an edge detection algorithm to the image data to identify boundary features within the produce item; and
   determining, as a function of the boundary features, a connectivity determination comprising one or more of a quantity and configuration of the plurality of subunits.

4. The system of claim 1, wherein assigning the defect classification label further comprises:
   generating a numerical value for the at least an object-level visual feature;

comparing the numerical value of the at least an object-level visual feature with an ambiguity threshold corresponding to the defect type;
capturing, as a function of comparing the numerical value of the at least an object-level visual feature with the ambiguity threshold, secondary image data of the produce item; and
re-evaluating the at least an object-level visual feature using the secondary image data to refine the defect classification label.

5. The system of claim 1, wherein the at least a processor is further configured to determine a position of a stem of the produce item as a function of the defect classification label, wherein determining the position of the stem of the produce item comprises:
   generating, as a function of the defect classification label, a three-dimensional spatial representation of the produce item as a function of the image data;
   analyzing the three-dimensional spatial representation using a stem identification algorithm configured to detect a geometric feature corresponding to the stem; and
   determining a three-dimensional pose of the stem, the three-dimensional pose of the stem comprising a location and orientation of the stem in space.

6. The system of claim 5, wherein controlling the at least an actuated arm to perform a handling operation on the produce item comprises:
   generating a motion plan to position the at least an actuated arm relative to the determined three-dimensional pose of the stem as a function of the location of the stem in space;
   determining an approach vector and tool orientation as a function of the orientation of the stem in space; and
   actuating a removal tool operatively coupled to the at least an actuated arm to engage the produce item for trimming.

7. The system of claim 1, wherein the at least an actuated arm comprises a removal tool configured to engage a stem of the produce item.

8. The system of claim 1, wherein the robotic frame further comprises a handling mechanism comprising a hook system, wherein:
   the hook system is configured to selectively engage and reposition the produce item as a function of the defect classification label; and
   the handling mechanism is operatively coupled to the at least an actuated arm.

9. The system of claim 1, wherein the at least an actuated arm comprises:
   a first actuated arm, wherein the first actuated arm is operatively coupled to a removal tool; and
   a second actuated arm, wherein the second actuated arm is operatively coupled to a handling mechanism.

10. A method for automated produce grading and sorting using machine vision and robotics, the method comprising:
   receiving, from a machine-vision system comprising at least a camera, image data comprising at least two captured viewpoints of a produce item;
   extracting, using at least a processor, at least an object-level visual feature from the image data using a machine vision model;
   assigning, using the at least a processor, a defect classification label to the produce item as a function of the at least an object-level visual feature, wherein assigning the defect classification label to the produce item further comprises:

identifying a defect type as a function of the at least an object-level visual feature;

comparing the at least an object-level visual feature to a defect-specific threshold; and outputting the defect classification label as a function of comparing the at least an object-level visual feature to the defect-specific threshold; and controlling, using the at least a processor, at least an actuated arm of a robotic frame to perform a handling operation on the produce item as a function of the defect classification label.

11. The method of claim 10, further comprising estimating a hydration of the produce item, wherein estimating the hydration of the produce item comprises:

receiving the at least an object-level visual feature from the image data;

applying a regression model to the at least an object-level visual feature; and generating a hydration score for the produce item as a function of an output of the regression model.

12. The method of claim 10, further comprising detecting a plurality of subunits of the produce item, wherein detecting the plurality of subunits of the produce item comprises:

applying an edge detection algorithm to the image data to identify boundary features within the produce item; and determining, as a function of the boundary features, a connectivity determination comprising one or more of a quantity and configuration of the plurality of subunits.

13. The method of claim 10, wherein assigning the defect classification label further comprises:

generating a numerical value for the at least an object-level visual feature;

comparing the numerical value of the at least an object-level visual feature with an ambiguity threshold corresponding to the defect type;

capturing, as a function of comparing the numerical value of the at least an object-level visual feature with the ambiguity threshold, secondary image data of the produce item; and re-evaluating the at least an object-level visual feature using the secondary image data to refine the defect classification label.

14. The method of claim 10, further comprising determining a position of a stem of the produce item as a function of the defect classification label, wherein determining the position of the stem of the produce item comprises:

generating, as a function of the defect classification label, a three-dimensional spatial representation of the produce item as a function of the image data;

analyzing the three-dimensional spatial representation using a stem identification algorithm configured to detect a geometric feature corresponding to the stem; and determining a three-dimensional pose of the stem, the three-dimensional pose of the stem comprising a location and orientation of the stem in space.

15. The method of claim 14, wherein controlling the at least an actuated arm to perform a handling operation on the produce item comprises:

generating a motion plan to position the at least an actuated arm relative to the determined three-dimensional pose of the stem as a function of the location of the stem in space;

determining an approach vector and tool orientation as a function of the orientation of the stem in space; and actuating a removal tool operatively coupled to the at least an actuated arm to engage the produce item for trimming.

16. The method of claim 10, wherein the at least an actuated arm comprises a removal tool configured to engage a stem of the produce item.

17. The method of claim 10, wherein the robotic frame further comprises a handling mechanism comprising a hook system, wherein:

the hook system is configured to selectively engage and reposition the produce item as a function of the defect classification label; and the handling mechanism is operatively coupled to the at least an actuated arm.

18. The method of claim 10, wherein the at least an actuated arm comprises:

a first actuated arm, wherein the first actuated arm is operatively coupled to a removal tool; and a second actuated arm, wherein the second actuated arm is operatively coupled to a handling mechanism.

* * * * *